(12) United States Patent
Marks et al.

(10) Patent No.: US 12,530,620 B2
(45) Date of Patent: Jan. 20, 2026

(54) INTENT-BASED AUTOMATION

(71) Applicant: UiPath, Inc., New York, NY (US)

(72) Inventors: Justin Marks, Redmond, WA (US); Theodore G. Kummert, Woodinville, WA (US); Bogdan Ripa, Bucharest (RO); Gregory Barello, Seattle, WA (US)

(73) Assignee: UiPath, Inc., New York, NY (US)

( * ) Notice: Subject to any disclaimer, the term of this patent is extended or adjusted under 35 U.S.C. 154(b) by 834 days.

(21) Appl. No.: 17/814,955

(22) Filed: Jul. 26, 2022

(65) Prior Publication Data
US 2024/0046142 A1 Feb. 8, 2024

(51) Int. Cl.
G06N 20/00 (2019.01)
G05B 19/418 (2006.01)
G06F 18/23 (2023.01)
G06F 40/20 (2020.01)
G06F 40/30 (2020.01)

(52) U.S. Cl.
CPC ....... *G06N 20/00* (2019.01); *G05B 19/41835* (2013.01); *G06F 18/23* (2023.01); *G06F 40/20* (2020.01); *G06F 40/30* (2020.01)

(58) Field of Classification Search
CPC ......... G06N 20/00; G06F 40/30; G06F 40/20; G06F 18/23; G05B 19/41835
See application file for complete search history.

(56) References Cited

U.S. PATENT DOCUMENTS

| 10,613,838 | B2 | 4/2020 | Kim et al. |
| 10,860,905 | B1 | 12/2020 | Gligan et al. |
| 10,970,639 | B2 | 4/2021 | Bataller et al. |
| 11,080,548 | B1 | 8/2021 | Skarda |
| 2019/0324781 | A1* | 10/2019 | Ramamurthy ............ G06F 8/70 |
| 2020/0206920 | A1 | 7/2020 | Ma et al. |
| 2020/0311605 | A1 | 10/2020 | Hollander et al. |

(Continued)

OTHER PUBLICATIONS

Alec Radford et al., "Learning Transferable Visual Models From Natural Language Supervision," available at https://arxiv.org/abs/2103.00020 (Feb. 26, 2021).

(Continued)

*Primary Examiner* — Barbara M Level

(74) *Attorney, Agent, or Firm* — LeonardPatel PC; Michael A. Leonard, II; Sheetal S. Patel

(57) ABSTRACT

Intent-based automation that discovers automatable tasks and/or determines task variants in data is disclosed. Task capture data may be utilized to determine task variants in task mining data. Semantic understanding of user actions by artificial intelligence (AI)/machine learning (ML) model(s), for example, may be applied to determine the intent of the user rather than only focusing on what actions the user is performing on the computing system. Application logs and semantic understanding may be used to facilitate a more accurate determination of what the user actually intends to do. Task capture for individual user flows may be performed. Once these are captured, task capture algorithms and AI/ML models are used to determine which parts of the flows are similar and/or match and which parts are unique. The path through these flows can then be followed to build a process graph that includes decision points representing the unique flows.

26 Claims, 16 Drawing Sheets

(56) References Cited

U.S. PATENT DOCUMENTS

| | | | |
|---|---|---|---|
| 2021/0086354 A1* | 3/2021 | Berg | .................. G06Q 10/0633 |
| 2022/0011732 A1 | 1/2022 | Hall | |
| 2022/0051136 A1 | 2/2022 | Côté et al. | |
| 2022/0147324 A1 | 5/2022 | Kessler et al. | |
| 2022/0414527 A1* | 12/2022 | Pandya | .................. G06F 9/4881 |
| 2023/0120358 A1* | 4/2023 | Shaffer | ............... H04M 3/5175 |
| | | | 379/265.12 |

OTHER PUBLICATIONS

Ting Chen et al., "A Simple Framework for Contrastive Learning of Visual Representations," available at https://arxiv.prg/pdf/2002.05709.pdf (Jul. 1, 2020).

UiPath task mining tool page available at https://www.uipath.com/product/task-mining (last accessed Jun. 28, 2022).

* cited by examiner

INTENT-BASED AUTOMATION

FIELD

The present invention generally relates to automation, and more specifically, to intent-based automation that discovers automatable tasks and/or determines task variants in data.

BACKGROUND

Task capture in robotic process automation (RPA) allows users to manually, or RPA robots or other processes automatically, to record a task with the flow of actions. Task mining, on the other hand, records user interactions from a set of users and feeds the recordings to artificial intelligence (AI)/machine learning (ML) model(s) to identify automatable tasks. RPA providers such as Pega Workforce Intelligence™ and Kryon® perform task monitoring rather than task mining. These tools do not identify the intent of the user. Rather, they determine how and where the user spends time on the computing system. For example, the analytics provided by those tools may indicate that 12% of the day was spent on Outlook®, 15% of the day was spent on Salesforce®, etc. However, these tools do not actually determine what the users are doing in these applications. Accordingly, an improved and/or alternative approach may be beneficial.

SUMMARY

Certain embodiments of the present invention may provide solutions to the problems and needs in the art that have not yet been fully identified, appreciated, or solved by current software automation technologies. For example, some embodiments of the present invention pertain to intent-based automation that discovers automatable tasks and/or determines task variants in data.

In an embodiment, a non-transitory computer-readable medium stores a computer program for performing intent-based automation. The computer program is configured to cause at least one processor to run a clustering AI/ML model on vector representations of a sequence of screens pertaining to a captured task flow to produce a sequence of clusters in a trace to produce a trace including a sequence of clusters. The computer program is also configured to cause the at least one processor to run a classifier AI/ML model on the sequence of clusters in the trace from the clustering AI/ML model. When the classifier AI/ML model identifies a task type from the sequence of clusters in the trace, the computer program is further configured to cause the at least one processor to map the classified task type to an RPA workflow that accomplishes an intent of the captured task flow.

In another embodiment, a computer-implemented method includes running a clustering AI/ML model on vector representations of a sequence of screens pertaining to a captured task flow to produce a trace including a sequence of clusters. The computer-implemented method also includes running a classifier AI/ML model on the sequence of clusters in the trace from the clustering AI/ML model. When the classifier AI/ML model identifies a task type from the sequence of clusters in the trace, the computer-implemented method includes mapping the classified task type to an RPA workflow that accomplishes an intent of the captured task flow. When the classifier AI/ML model does not identify a task type from the sequence of clusters in the trace, the computer-implemented method includes automatically generating activities for actions in the task flow.

In yet another embodiment, a computing system includes memory storing computer program instructions and at least one processor configured to execute the computer program instructions. The computer program instructions are configured to cause the at least one processor to run a clustering AI/ML model on vector representations of a sequence of screens pertaining to a captured task flow to produce a trace including a sequence of clusters. The computer program instructions are also configured to cause the at least one processor to run a classifier AI/ML model on the sequence of clusters in the trace from the clustering AI/ML model. When the classifier AI/ML model identifies a task type from the sequence of clusters in the trace, The computer program instructions are configured to cause the at least one processor to map the classified task type to an RPA workflow that accomplishes an intent of the captured task flow. The classifier AI/ML model is configured to compare the sequence of clusters in the trace from the clustering AI/ML model to other sequences of clusters representing traces from previously identified task types to determine the task type or to represent individual screens or the sequence of screens as vectors and compute a vector distance from vectors for previously identified task types.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
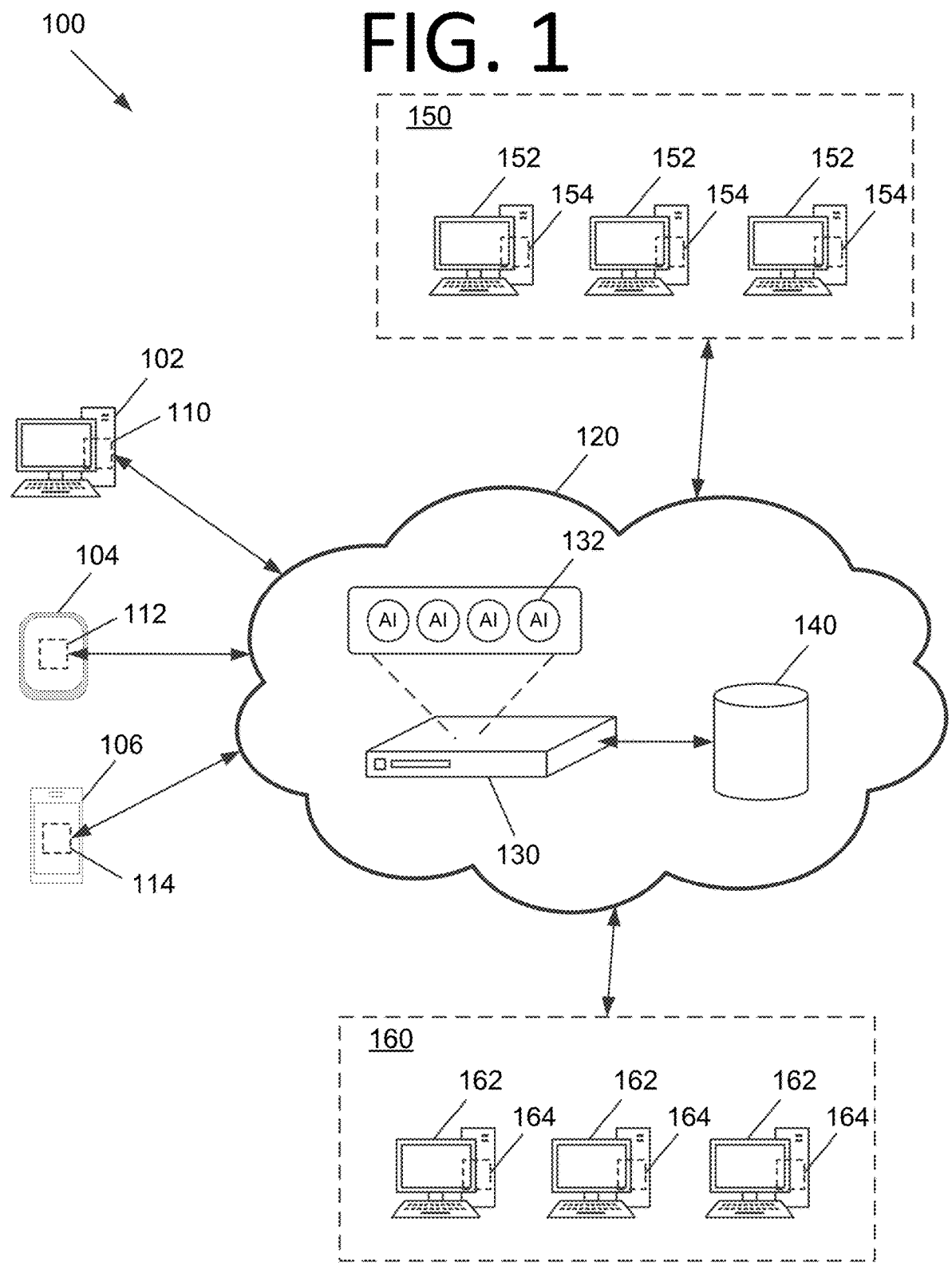
FIG. 1 is an architectural diagram illustrating a hyper-automation system, according to an embodiment of the present invention.

Some embodiments pertain to intent-based automation that discovers automatable tasks and/or determines task variants in data. Task capture data may be utilized to determine task variants in task mining data. Semantic understanding of user actions by AI/ML model(s), for example, may be applied to determine the intent of the user rather than only focusing on what actions the user is performing on the computing system. Application logs and semantic understanding facilitate a more accurate determination of what the user actually intends to do.

Task capture for individual user flows (also called "variants") may be collected manually by users following a given process. While a process may be "well defined" (e.g., approving an expense report), there may be different ways that the process is accomplished by humans and/or different flows using tools to accomplish the goals. This can range from relatively simple variations, such as filling out a form from the bottom to the top versus from the top to the bottom, to more complex variations due to exceptional cases, alternative flows, error conditions, etc. Once these are captured, task capture algorithms and AI/ML models are used to determine which parts of the flows are similar and/or match and which parts are unique. The path through these flows can then be followed to build a process graph that includes decision points representing the unique flows.

In some embodiments, a task flow is captured from a user. This task flow is fed as a point of interest to a task mining tool. As used herein, a "point of interest" is a task or process that a user wants to automate. For instance, a payroll employee may perform 50 unique tasks in a day, but choose to capture only one or two processes that he or she finds particularly onerous. By labeling or flagging those specific flows in the context of their larger work, the employee provides areas to focus on in a larger set of noisy data.

The task mining tool analyzes the task mining data by employing AI/ML model(s), and user actions are mapped to intent based on output from the AI/ML model(s). For instance, it may be determined that a user clicking on 6 textboxes and typing information into them equates to filling out a form, that typing in a username and password textbox and pressing enter or clicking a submit button equates to logging into Salesforce®, etc.). Mapping what an action means from a mere user interface (UI) event to an RPA activity in an RPA workflow, a clearer picture of the associated user process can be provided. RPA developers may then be able to leverage this information to provide richer activities than simple UI automation actions. Such richer activities may include logging into Salesforce® instead of navigating to the login page, clicking the username textbox, typing in the username, clicking on the password textbox, typing in the password, and clicking on "Login." This is simply a "Login to Salesforce" activity, which may be accomplished in an easier/faster way using application programming interfaces (APIs). More complex examples could include creating/updating a Salesforce® lead. The user may click on 20 fields of a form to accomplish this task, but knowing what the general nature of the task is allows use of alternative approaches to accomplish the same goal, such as using an API-based activity to update the lead. In certain embodiments, associated activities may be automatically generated in an RPA workflow that RPA developers can then use as is or modify further.

Current task mining applications passively record information while users use their computing systems. These applications do not allow users to provide information during the recording process. As such, no human-provided content or augmentation is available as part of the task mining dataset. Indeed, task mining is currently largely image-based, where computer vision (CV) is applied to screen captures to determine the graphical elements and text contained therein. Computer vision tasks include techniques for acquiring, processing, analyzing, and understanding digital images and extraction of high-dimensional data from the real world in order to produce numerical or symbolic information. Optical character recognition (OCR) is a CV function as well. However, it should be noted that CV does not provide context regarding what this information means.

In order to provide further context, some embodiments obtain additional information by hooking into the API stack of an application (e.g., Outlook®, Excel®, etc.) to obtain information from API calls made due to the user's interactions with these applications. One example of information that APIs may provide is getting more context from Excel®. Via APIs, it is possible to identify what workbook the user is working with, what sheet in that workbook the user is using, what cell(s) in that sheet are being modified, etc. These APIs provide an "action" log of what the user did in a given application.

Images captured during task mining recording and the associated API call information can be time synchronized, and the API information can be used to provide further understanding regarding what the user is doing in the screens. This may facilitate better understanding of user intent by matching sets of user actions to an activity, such as via image comparison techniques. For instance, CV (including OCR) may be used to extract information about a given screen and then a clustering algorithm may be used to match the extracted information to similar screens. Also, a full picture of what a user is doing may be understood by combining image analysis and API information collection. For example, screenshots, user interaction events, API events, operating system (OS)/document object model (DOM) events, user interaction/input types (e.g., mouse click versus typing), location data (e.g., where was the mouse clicked or text was entered on the screen), which mouse button was pressed, application/process name (e.g., a universal resource locator (URL) for the screen or the application that is currently running and active for a window), a UI descriptor, any combination thereof, etc.

In some embodiments, text on the screen may be used and fit to a natural language processing (NLP) model such as word2vec, or a more advanced semantic NLP model such as GPT-3, to build a vector representation of the screen. This may be more robust than using pixel values, for example. Certain objectives, such as contracted learning, may be applied to a large set of unlabeled data (e.g., screens) to build vector representations of the screens. A clustering approach, such as k-means clustering or Density-Based Spatial Clustering of Applications with Noise (DBSCAN), may then be used to obtain a clustered representation from the vector representation as an input. Certain objectives, such as contracted learning, may be applied to a large set of unlabeled data (e.g., screens) to build vector representations of the screens.

After the screen clustering has been performed, a classifier neural network AI/ML model may be trained that correlates images and actions to workflow types. For instance, loading a spreadsheet in Excel® can be correlated to a workflow for opening a file. Mappings can thus be learned using the classifier AI/ML model on top of the clustered representations of the screens. Known workflows that accomplish task types may then be stored in a repository, and these workflows may be used to accomplish a classified task identified by the classifier AI/ML model.

Some embodiments provide granular understanding of the actions performed on a specific application and find the business logic thereof. For example, when a user made changes to certain cells in Excel®, looking at the changes alone would only provide knowledge that changes were made to cells A3, A5, and A7, for example. However, by employing the semantic understanding of some embodiments, the AI/ML model(s) may understand that a certain formula was applied in Excel®, such as adding A3 and A5 as the result of A7.

Rather than focusing on what screen the user is using and where the user performs an action, some embodiments focus on what the user's intent is for that activity. For instance, instead of only understanding that a user clicked on a page and typed into a text box, the semantic understanding techniques of some embodiments recognize that the user is completing a form in an application. This is a more accurate representation of what the user intends to do when performing the action. Some examples of actions that the task mining approach of some embodiments may understand include, but are not limited to, filling in a form, viewing a report, editing customer details, sending an email, Logging into SAP®, and logging in to a computing system, etc. Currently, AI/ML models are trained to follow an action, attempt to match the action to known tasks, and categorizing the action to the matched task.

In some embodiments, after identifying the user intent, the user action may be mapped to associated activit(ies) in an RPA designer application, such as UiPath Studio™. Current task mining techniques output a sequence of actions or a set of automatable tasks from recordings of user interactions that to which CV has been applied. For example, when a user is performing a task in Salesforce®, consider the case where the user is creating a new customer. Current task mining techniques would only observe and identify actions involved in the task. However, some embodiments further identify that this task pertains to the intent of creating a new customer in Salesforce®. The identified intent is then matched with the associated activity in an RPA designer application. In certain embodiments, the AI/ML model may be further enhanced to automatically generate the associated activit(ies) in the RPA designer application.

FIG. 1 is an architectural diagram illustrating a hyper-automation system 100, according to an embodiment of the present invention. "Hyper-automation," as used herein, refers to automation systems that bring together components of process automation, integration tools, and technologies that amplify the ability to automate work. For instance, RPA may be used at the core of a hyper-automation system in some embodiments, and in certain embodiments, automation capabilities may be expanded with artificial intelligence (AI)/machine learning (ML), process mining, analytics, and/or other advanced tools. As the hyper-automation system learns processes, trains AI/ML models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, and scale automations.

Hyper-automation system 100 includes user computing systems, such as desktop computer 102, tablet 104, and smart phone 106. However, any desired user computing system may be used without deviating from the scope of the invention including, but not limited to, smart watches, laptop computers, servers, Internet-of-Things (IoT) devices, etc. Also, while three user computing systems are shown in FIG. 1, any suitable number of user computing systems may be used without deviating from the scope of the invention. For instance, in some embodiments, dozens, hundreds, thousands, or millions of user computing systems may be used. The user computing systems may be actively used by a user or run automatically without much or any user input.

Each user computing system 102, 104, 106 has respective automation process(es) 110, 112, 114 running thereon. Automation process(es) 110, 112, 114 may include, but are not limited to, RPA robots, part of an operating system, downloadable application(s) for the respective computing system, any other suitable software and/or hardware, or any combination of these without deviating from the scope of the invention. In some embodiments, one or more of process(es) 110, 112, 114 may be listeners. Listeners may be RPA robots, part of an operating system, a downloadable application for the respective computing system, or any other software and/or hardware without deviating from the scope of the invention. Indeed, in some embodiments, the logic of the listener(s) is implemented partially or completely via physical hardware.

Listeners monitor and record data pertaining to user interactions with respective computing systems and/or operations of unattended computing systems and send the data to a core hyper-automation system 120 via a network (e.g., a local area network (LAN), a mobile communications network, a satellite communications network, the Internet, any combination thereof, etc.). Listeners may be attended or unattended, depending on the application thereof. The listener data may include, but is not limited to, which buttons were clicked, where a mouse was moved, the text that was entered in a field, that one window was minimized and another was opened, the application associated with a window, a description from the user of the task that was being accomplished, etc. In certain embodiments, the data from the listeners may be sent periodically as part of a heartbeat message. In some embodiments, the data may be sent to core hyper-automation system 120 once a predetermined amount of data has been collected, after a predetermined time period has elapsed, or both. One or more servers, such as server 130, receive and store data from the listeners in a database, such as database 140.

Automation processes may execute the logic developed in workflows during design time. In the case of RPA, workflows may include a set of steps, defined herein as "activities," that are executed in a sequence or some other logical flow. Each activity may include an action, such as clicking a button, reading a file, writing to a log panel, etc. In some embodiments, workflows may be nested or embedded.

Long-running workflows for RPA in some embodiments are master projects that support service orchestration, human intervention, and long-running transactions in unattended environments. See, for example, U.S. Pat. No. 10,860,905. Human intervention comes into play when certain processes require human inputs to handle exceptions, approvals, or validation before proceeding to the next step in the activity. In this situation, the process execution is suspended, freeing up the RPA robots until the human task completes.

A long-running workflow may support workflow fragmentation via persistence activities and may be combined with invoke process and non-user interaction activities, orchestrating human tasks with RPA robot tasks. In some embodiments, multiple or many computing systems may participate in executing the logic of a long-running workflow. The long-running workflow may run in a session to facilitate speedy execution. In some embodiments, long-running workflows may orchestrate background processes that may contain activities performing API calls and running in the long-running workflow session. These activities may be invoked by an invoke process activity in some embodiments. A process with user interaction activities that runs in a user session may be called by starting a job from a conductor activity (conductor described in more detail later herein). The user may interact through tasks that require forms to be completed in the conductor in some embodiments. Activities may be included that cause the RPA robot to wait for a form task to be completed and then resume the long-running workflow.

One or more of automation process(es) 110, 112, 114 is in communication with core hyper-automation system 120. In some embodiments, core hyper-automation system 120 may run a conductor application on one or more servers, such as server 130. While one server 130 is shown for illustration purposes, multiple or many servers that are proximate to one another or in a distributed architecture may be employed without deviating from the scope of the invention. For instance, one or more servers may be provided for conductor functionality, AI/ML model serving, authentication, governance, and/or any other suitable functionality without deviating from the scope of the invention. In some embodiments, core hyper-automation system 120 may incorporate or be part of a public cloud architecture, a private cloud architecture, a hybrid cloud architecture, etc. In certain embodiments, core hyper-automation system 120 may host multiple software-based servers on one or more computing systems, such as server 130. In some embodiments, one or more servers of core hyper-automation system 120, such as server 130, may be implemented via one or more virtual machines (VMs).

In some embodiments, one or more of automation process(es) 110, 112, 114 may call one or more AI/ML models 132 deployed on or accessible by core hyper-automation system 120. AI/ML models 132 may be trained for any suitable purpose without deviating from the scope of the invention, as will be discussed in more detail later herein. Two or more of AI/ML models 132 may be chained in some embodiments (e.g., in series, in parallel, or a combination thereof) such that they collectively provide collaborative output(s). AI/ML models 132 may perform or assist with CV (including OCR), document processing and/or understanding, semantic learning and/or analysis, analytical predictions, process discovery, task mining, testing, automatic RPA workflow generation, sequence extraction, clustering detection, audio-to-text translation, any combination thereof, etc. However, any desired number and/or type(s) of AI/ML models may be used without deviating from the scope of the invention. Using multiple AI/ML models may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models are deployed locally on at least one of computing systems 102, 104, 106.

In some embodiments, multiple AI/ML models 132 may be used, potentially in series, in parallel, or a combination thereof. Each AI/ML model 132 is an algorithm (or model) that runs on the data, and the AI/ML model itself may be a deep learning neural network (DLNN) of trained artificial "neurons" that are trained on training data, for example. In some embodiments, AI/ML models 132 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to perform the desired functionality.

Hyper-automation system 100 may provide four main groups of functionality in some embodiments: (1) discovery; (2) building automations; (3) management; and (4) engagement. Automations (e.g., run on a user computing system, a server, etc.) may be run by software robots, such as RPA robots, in some embodiments. For instance, attended robots, unattended robots, and/or test robots may be used. Attended robots work with users to assist them with tasks (e.g., via UiPath Assistant™). Unattended robots work independently of users and may run in the background, potentially without user knowledge. Test robots are unattended robots that run test cases against applications or RPA workflows. Test robots may be run on multiple computing systems in parallel in some embodiments.

The discovery functionality may discover and provide automatic recommendations for different opportunities of automations of business processes. Such functionality may be implemented by one or more servers, such as server 130. The discovery functionality may include providing an automation hub, process mining, task mining, and/or task capture in some embodiments. The automation hub (e.g., UiPath Automation Hub™) may provide a mechanism for managing automation rollout with visibility and control. Automation ideas may be crowdsourced from employees via a submission form, for example. Feasibility and return on investment (ROI) calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relation management (CRM) applications, email applications, call center applications, etc.) to identify what end-to-end processes exist in an organization and how to automate them effectively, as well as indicate what the impact of the automation will be. This data may be gleaned from user computing systems 102, 104, 106 by listeners, for example, and processed by servers, such as server 130. One or more AI/ML models 132 may be employed for this purpose in some embodiments. This information may be exported to the automation hub to speed up implementation and avoid manual information transfer. The goal of process mining may be used to increase business value by automating processes within an organization. Some examples of process mining goals include, but are not limited to, increasing profit, improving customer satisfaction, regulatory and/or contractual compliance, improving employee efficiency, etc.

Task mining (e.g., via UiPath Automation Cloud™ and/or UiPath AI Center™) identifies and aggregates workflows (e.g., employee workflows), and then applies AI to expose patterns and variations in day-to-day tasks, scoring such tasks for ease of automation and potential savings (e.g., time and/or cost savings). One or more AI/ML models 132 may be employed to uncover recurring task patterns in the data. Repetitive tasks that are ripe for automation may then be identified. This information may initially be provided by listeners and analyzed on servers of core hyper-automation system 120, such as server 130, in some embodiments. The findings from task mining (e.g., Extensible Application Markup Language (XAML) process data) may be exported to process documents or to a designer application such as UiPath Studio™ to create and deploy automations more rapidly. Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to a designer application in some embodiments, such as UiPath Studio™. Task capture may simplify the requirements gathering process for both subject matter experts explaining a process and Center of Excellence (CoE) members providing production-grade automations.

Building automations may be accomplished via a designer application (e.g., UiPath Studio™, UiPath StudioX™, UiPath Web™, etc.). For instance, RPA developers of an RPA development facility 150 may use RPA designer applications 154 of computing systems 152 to build and test automations for various applications and environments, such as web, mobile, SAP®, and virtualized desktops. API integration may be provided for various applications, technologies, and platforms. Predefined activities, drag-and-drop modeling, and a workflow recorder, may make automation easier with minimal coding. Document understanding functionality may be provided via Drag-and-drop AI skills for data extraction and interpretation that call one or more AI/ML models 132. Such automations may process virtually any document type and format, including tables, checkboxes, signatures, and handwriting. When data is validated or exceptions are handled, this information may be used to retrain the respective AI/ML models, improving their accuracy over time.

An integration service may allow developers to seamlessly combine user interface (UI) automation with API automation, for example. Automations may be built that require APIs or traverse both API and non-API applications and systems. A repository (e.g., UiPath Object Repository™) or marketplace (e.g., UiPath Marketplace™) for pre-built RPA and AI templates and solutions may be provided to allow developers to automate a wide variety of processes more quickly. Thus, when building automations, hyper-automation system 100 may provide user interfaces, development environments, API integration, pre-built and/or custom-built AI/ML models, development templates, integrated development environments (IDEs), and advanced AI capabilities. Hyper-automation system 100 enables development, deployment, management, configuration, monitoring, debugging, and maintenance of RPA robots in some embodiments, which may provide automations for hyper-automation system 100.

In some embodiments, components of hyper-automation system 100, such as designer application(s) and/or an external rules engine, provide support for managing and enforcing governance policies for controlling various functionality provided by hyper-automation system 100. Governance is the ability for organizations to put policies in place to prevent users from developing automations (e.g., RPA robots) capable of taking actions that may harm the organization, such as violating the E.U. General Data Protection Regulation (GDPR), the U.S. Health Insurance Portability and Accountability Act (HIPAA), third party application terms of service, etc. Since developers may otherwise create automations that violate privacy laws, terms of service, etc. while performing their automations, some embodiments implement access control and governance restrictions at the robot and/or robot design application level. This may provide an added level of security and compliance into the automation process development pipeline in some embodiments by preventing developers from taking dependencies on unapproved software libraries that may either introduce security risks or work in a way that violates policies, regulations, privacy laws, and/or privacy policies. See, for example, U.S. Patent Application Publication No. 2022/0011732.

The management functionality may provide management, deployment, and optimization of automations across an organization. The management functionality may include orchestration, test management, AI functionality, and/or insights in some embodiments. Management functionality of hyper-automation system 100 may also act as an integration point with third-party solutions and applications for automation applications and/or RPA robots. The management capabilities of hyper-automation system 100 may include, but are not limited to, facilitating provisioning, deployment, configuration, queuing, monitoring, logging, and interconnectivity of RPA robots, among other things.

A conductor application, such as UiPath Orchestrator™ (which may be provided as part of the UiPath Automation Cloud™ in some embodiments, or on premises, in VMs, in a private or public cloud, in a Linux™ VM, or as a cloud native single container suite via UiPath Automation Suite™), provides orchestration capabilities to deploy, monitor, optimize, scale, and ensure security of RPA robot deployments. A test suite (e.g., UiPath Test Suite™) may provide test management to monitor the quality of deployed automations. The test suite may facilitate test planning and execution, meeting of requirements, and defect traceability. The test suite may include comprehensive test reporting.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by human users.

A data service (e.g., UiPath Data Service™) may be stored in database 140, for example, and bring data into a single, scalable, secure place with a drag-and-drop storage interface. Some embodiments may provide low-code or no-code data modeling and storage to automations while ensuring seamless access, enterprise-grade security, and scalability of the data. AI functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots) may call AI/ML models from the AI center, such as AI/ML models 132. Performance of the AI/ML models may be monitored, and the AI/ML models may be trained and improved using human-validated data, such as that provided by data review center 160. Human reviewers may provide labeled data to core hyper-automation system 120 via a review application 152 on computing systems 154. For instance, human reviewers may validate that predictions by AI/ML models 132 are accurate or provide corrections otherwise. This dynamic input may then be saved as training data for retraining AI/ML models 132, and may be stored in a database such as database 140, for example. The AI center may then schedule and execute training jobs to train the new versions of the AI/ML models using the training data. Both positive and negative examples may be stored and used for retraining of AI/ML models 132.

The engagement functionality engages humans and automations as one team for seamless collaboration on desired processes. Low-code applications may be built (e.g., via UiPath Apps™) to connect browser tabs and legacy software, even that lacking APIs in some embodiments. Applications may be created quickly using a web browser through a rich library of drag-and-drop controls, for instance. An application can be connected to a single automation or multiple automations.

An action center (e.g., UiPath Action Center™) provides a straightforward and efficient mechanism to hand off processes from automations to humans, and vice versa. Humans may provide approvals or escalations, make exceptions, etc. The automation may then perform the automatic functionality of a given workflow.

A local assistant may be provided as a launchpad for users to launch automations (e.g., UiPath Assistant™). This functionality may be provided in a tray provided by an operating system, for example, and may allow users to interact with RPA robots and RPA robot-powered applications on their computing systems. An interface may list automations approved for a given user and allow the user to run them. These may include ready-to-go automations from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

Chatbots (e.g., UiPath Chatbots™), social messaging applications, and/or voice commands may enable users to run automations. This may simplify access to information, tools, and resources users need in order to interact with customers or perform other activities. Conversations between people may be readily automated, as with other processes. Trigger RPA robots kicked off in this manner may perform operations such as checking an order status, posting data in a CRM, etc., potentially using plain language commands.

End-to-end measurement and government of an automation program at any scale may be provided by hyper-automation system 100 in some embodiments. Per the above, analytics may be employed to understand the performance of automations (e.g., via UiPath Insights™). Data modeling and analytics using any combination of available business metrics and operational insights may be used for various automated processes. Custom-designed and pre-built dashboards allow data to be visualized across desired metrics, new analytical insights to be discovered, performance indicators to be tracked, ROI to be discovered for automations, telemetry monitoring to be performed on user computing systems, errors and anomalies to be detected, and automations to be debugged. An automation management console (e.g., UiPath Automation Ops™) may be provided to manage automations throughout the automation lifecycle. An organization may govern how automations are built, what users can do with them, and which automations users can access.

Hyper-automation system 100 provides an iterative platform in some embodiments. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automations.

Figure 2:
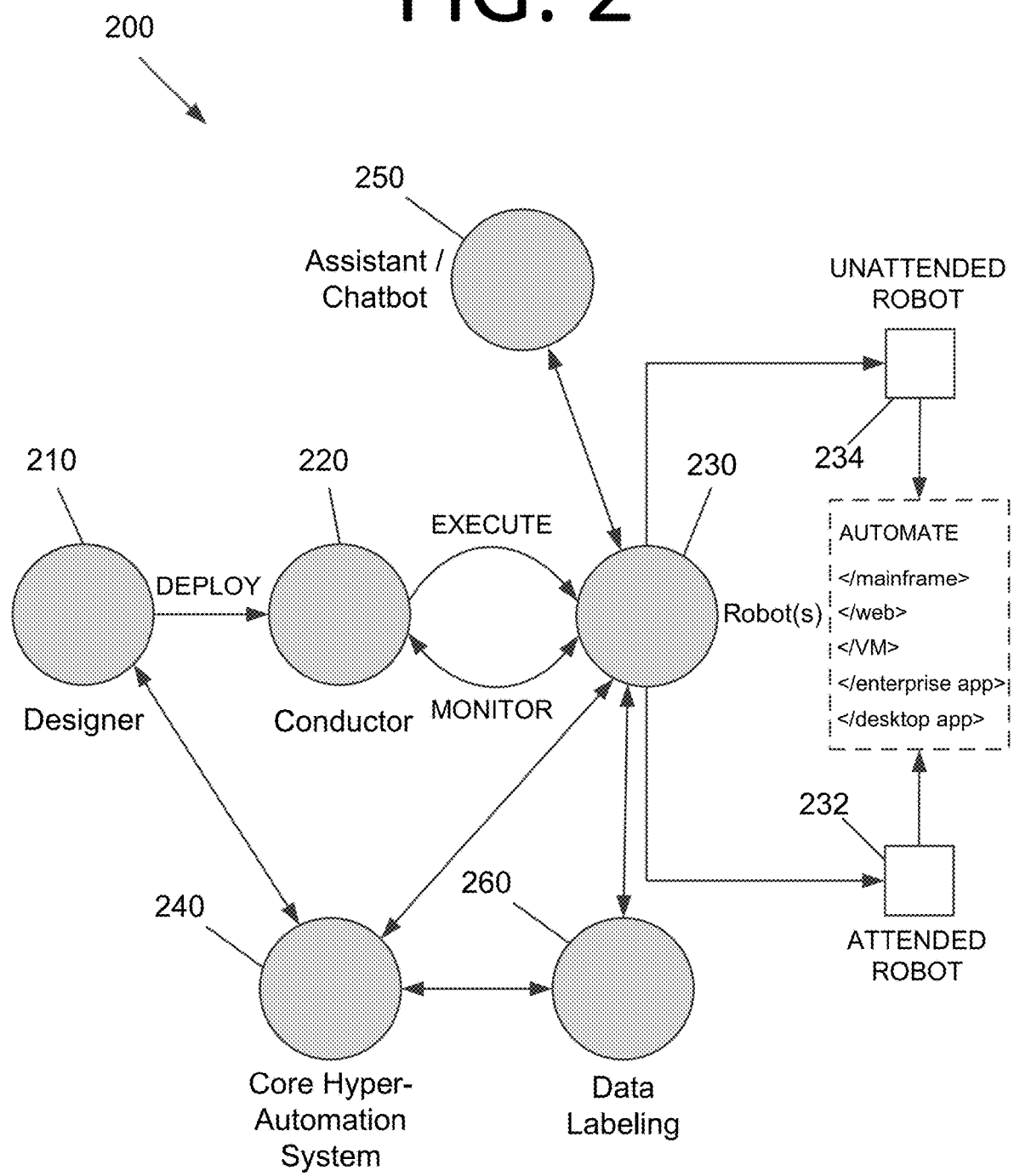
FIG. 2 is an architectural diagram illustrating an RPA system, according to an embodiment of the present invention.

FIG. 2 is an architectural diagram illustrating an RPA system 200, according to an embodiment of the present invention. In some embodiments, RPA system 200 is part of hyper-automation system 100 of FIG. 1. RPA system 200 includes a designer 210 that allows a developer to design and implement workflows. Designer 210 may provide a solution for application integration, as well as automating third-party applications, administrative Information Technology (IT) tasks, and business IT processes. Designer 210 may facilitate development of an automation project, which is a graphical representation of a business process. Simply put, designer 210 facilitates the development and deployment of workflows and robots. In some embodiments, designer 210 may be an application that runs on a user's desktop, an application that runs remotely in a VM, a web application, etc.

The automation project enables automation of rule-based processes by giving the developer control of the execution order and the relationship between a custom set of steps developed in a workflow, defined herein as "activities" per the above. One commercial example of an embodiment of designer 210 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 210, execution of business processes is orchestrated by conductor 220, which orchestrates one or more robots 230 that execute the workflows developed in designer 210. One commercial example of an embodiment of conductor 220 is UiPath Orchestrator™. Conductor 220 facilitates management of the creation, monitoring, and deployment of resources in an environment. Conductor 220 may act as an integration point with third-party solutions and applications. Per the above, in some embodiments, conductor 220 may be part of core hyper-automation system 120 of FIG. 1.

Conductor 220 may manage a fleet of robots 230, connecting and executing robots 230 from a centralized point. Types of robots 230 that may be managed include, but are not limited to, attended robots 232, unattended robots 234, development robots (similar to unattended robots 234, but used for development and testing purposes), and nonproduction robots (similar to attended robots 232, but used for development and testing purposes). Attended robots 232 are triggered by user events and operate alongside a human on the same computing system. Attended robots 232 may be used with conductor 220 for a centralized process deployment and logging medium. Attended robots 232 may help the human user accomplish various tasks, and may be triggered by user events. In some embodiments, processes cannot be started from conductor 220 on this type of robot and/or they cannot run under a locked screen. In certain embodiments, attended robots 232 can only be started from a robot tray or from a command prompt. Attended robots 232 should run under human supervision in some embodiments.

Unattended robots 234 run unattended in virtual environments and can automate many processes. Unattended robots 234 may be responsible for remote execution, monitoring, scheduling, and providing support for work queues. Debugging for all robot types may be run in designer 210 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 220 may have various capabilities including, but not limited to, provisioning, deployment, configuration, queueing, monitoring, logging, and/or providing interconnectivity. Provisioning may include creating and maintenance of connections between robots 230 and conductor 220 (e.g., a web application). Deployment may include assuring the correct delivery of package versions to assigned robots 230 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., a structured query language (SQL) database or a "not only" SQL (NoSQL) database) and/or another storage mechanism (e.g., Elastic Search®, which provides the ability to store and quickly query large datasets). Conductor 220 may provide interconnectivity by acting as the centralized point of communication for third-party solutions and/or applications.

Robots 230 are execution agents that implement workflows built in designer 210. One commercial example of some embodiments of robot(s) 230 is UiPath Robots™. In some embodiments, robots 230 install the Microsoft Windows® Service Control Manager (SCM)-managed service by default. As a result, such robots 230 can open interactive Windows® sessions under the local system account, and have the rights of a Windows® service.

In some embodiments, robots 230 can be installed in a user mode. For such robots 230, this means they have the same rights as the user under which a given robot 230 has been installed. This feature may also be available for High Density (HD) robots, which ensure full utilization of each machine at its maximum potential. In some embodiments, any type of robot 230 may be configured in an HD environment.

Robots 230 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 220 and the execution hosts (i.e., the computing systems on which robots 230 are executed). These services are trusted with and manage the credentials for robots 230. A console application is launched by the SCM under the local system.

User mode robot services in some embodiments manage and monitor Windows® sessions and act as a proxy between conductor 220 and the execution hosts. User mode robot services may be trusted with and manage the credentials for robots 230. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 230 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 210 may also be independent of browser zoom level in some embodiments. For applications that are DPI-unaware or intentionally marked as unaware, DPI may be disabled in some embodiments.

RPA system 200 in this embodiment is part of a hyper-automation system. Developers may use designer 210 to build and test RPA robots that utilize AI/ML models deployed in core hyper-automation system 240 (e.g., as part of an AI center thereof). Such RPA robots may send input for execution of the AI/ML model(s) and receive output therefrom via core hyper-automation system 240.

One or more of robots 230 may be listeners, as described above. These listeners may provide information to core hyper-automation system 240 regarding what users are doing when they use their computing systems. This information may then be used by core hyper-automation system for process mining, task mining, task capture, etc.

An assistant/chatbot 250 may be provided on user computing systems to allow users to launch RPA local robots. The assistant may be located in a system tray, for example.

Chatbots may have a user interface so users can see text in the chatbot. Alternatively, chatbots may lack a user interface and run in the background, listening using the computing system's microphone for user speech.

In some embodiments, data labeling may be performed by a user of the computing system on which a robot is executing or on another computing system that the robot provides information to. For instance, if a robot calls an AI/ML model that performs CV on images for VM users, but the AI/ML model does not correctly identify a button on the screen, the user may draw a rectangle around the misidentified or non-identified component and potentially provide text with a correct identification. This information may be provided to core hyper-automation system 240 and then used later for training a new version of the AI/ML model.

Figure 3:
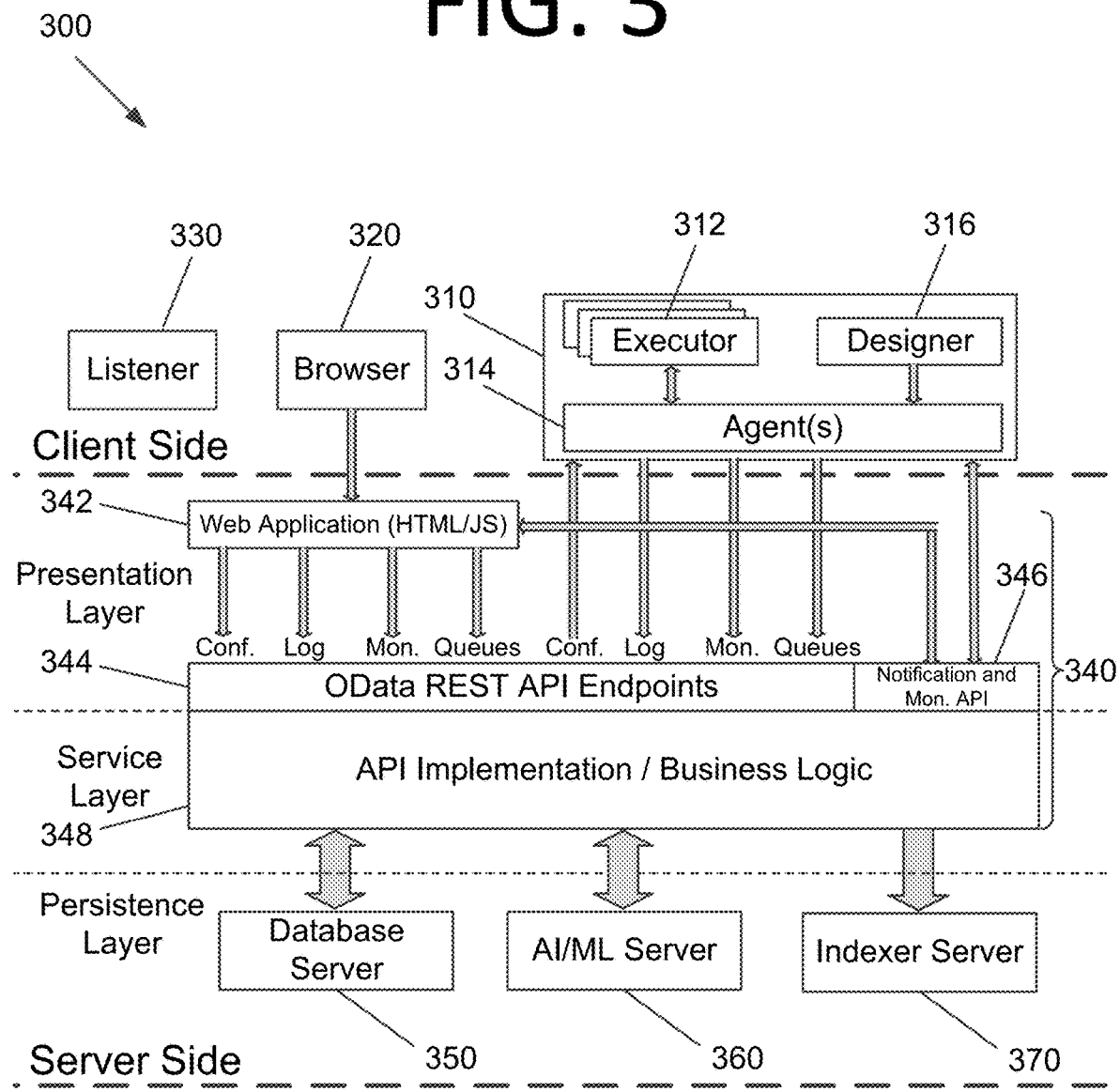
FIG. 3 is an architectural diagram illustrating a deployed RPA system, according to an embodiment of the present invention.

FIG. 3 is an architectural diagram illustrating a deployed RPA system 300, according to an embodiment of the present invention. In some embodiments, RPA system 300 may be a part of RPA system 200 of FIG. 2 and/or hyper-automation system 100 of FIG. 1. Deployed RPA system 300 may be a cloud-based system, an on-premises system, a desktop-based system that offers enterprise level, user level, or device level automation solutions for automation of different computing processes, etc.

It should be noted that the client side, the server side, or both, may include any desired number of computing systems without deviating from the scope of the invention. On the client side, a robot application 310 includes executors 312, an agent 314, and a designer 316. However, in some embodiments, designer 316 may not be running on the same computing system as executors 312 and agent 314. Executors 312 are running processes. Several business projects may run simultaneously, as shown in FIG. 3. Agent 314 (e.g., a Windows® service) is the single point of contact for all executors 312 in this embodiment. All messages in this embodiment are logged into conductor 340, which processes them further via database server 350, an AI/ML server 360, an indexer server 370, or any combination thereof. As discussed above with respect to FIG. 2, executors 312 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 314 is also responsible for sending the status of the robot (e.g., periodically sending a "heartbeat" message indicating that the robot is still functioning) and downloading the required version of the package to be executed. The communication between agent 314 and conductor 340 is always initiated by agent 314 in some embodiments. In the notification scenario, agent 314 may open a WebSocket channel that is later used by conductor 330 to send commands to the robot (e.g., start, stop, etc.).

A listener 330 monitors and records data pertaining to user interactions with an attended computing system and/or operations of an unattended computing system on which listener 330 resides. Listener 330 may be an RPA robot, part of an operating system, a downloadable application for the respective computing system, or any other software and/or hardware without deviating from the scope of the invention. Indeed, in some embodiments, the logic of the listener is implemented partially or completely via physical hardware.

On the server side, a presentation layer (web application 342, Open Data Protocol (OData) Representative State Transfer (REST) Application Programming Interface (API) endpoints 344, and notification and monitoring 346), a service layer (API implementation/business logic 348), and a persistence layer (database server 350, AI/ML server 360, and indexer server 370) are included. Conductor 340 includes web application 342, OData REST API endpoints 344, notification and monitoring 346, and API implementation/business logic 348. In some embodiments, most actions that a user performs in the interface of conductor 340 (e.g., via browser 320) are performed by calling various APIs. Such actions may include, but are not limited to, starting jobs on robots, adding/removing data in queues, scheduling jobs to run unattended, etc. without deviating from the scope of the invention. Web application 342 is the visual layer of the server platform. In this embodiment, web application 342 uses Hypertext Markup Language (HTML) and JavaScript (JS). However, any desired markup languages, script languages, or any other formats may be used without deviating from the scope of the invention. The user interacts with web pages from web application 342 via browser 320 in this embodiment in order to perform various actions to control conductor 340. For instance, the user may create robot groups, assign packages to the robots, analyze logs per robot and/or per process, start and stop robots, etc.

In addition to web application 342, conductor 340 also includes service layer that exposes OData REST API endpoints 344. However, other endpoints may be included without deviating from the scope of the invention. The REST API is consumed by both web application 342 and agent 314. Agent 314 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 340. Queueing REST endpoints may be responsible for queues and queue item management, such as adding data to a queue, obtaining a transaction from the queue, setting the status of a transaction, etc.

Monitoring REST endpoints may monitor web application 342 and agent 314. Notification and monitoring API 346 may be REST endpoints that are used for registering agent 314, delivering configuration settings to agent 314, and for sending/receiving notifications from the server and agent 314. Notification and monitoring API 346 may also use WebSocket communication in some embodiments.

The APIs in the service layer may be accessed through configuration of an appropriate API access path in some embodiments, e.g., based on whether conductor 340 and an overall hyper-automation system have an on-premises deployment type or a cloud-based deployment type. APIs for conductor 340 may provide custom methods for querying stats about various entities registered in conductor 340. Each logical resource may be an OData entity in some embodiments. In such an entity, components such as the robot, process, queue, etc., may have properties, relationships, and operations. APIs of conductor 340 may be consumed by web application 342 and/or agents 314 in two ways in some embodiments: by getting the API access information from conductor 340, or by registering an external application to use the OAuth flow.

The persistence layer includes a trio of servers in this embodiment—database server 350 (e.g., a SQL server), AI/ML server 360 (e.g., a server providing AI/ML model serving services, such as AI center functionality) and indexer server 370. Database server 350 in this embodiment stores the configurations of the robots, robot groups, associated processes, users, roles, schedules, etc. This information is managed through web application 342 in some embodiments. Database server 350 may manage queues and queue items. In some embodiments, database server 350 may store messages logged by the robots (in addition to or in lieu of indexer server 370). Database server 350 may also store process mining, task mining, and/or task capture-related data, received from listener 330 installed on the client side, for example. While no arrow is shown between listener 330 and database 350, it should be understood that listener 330 is able to communicate with database 350, and vice versa in some embodiments. This data may be stored in the form of PDDs, images, XAML files, etc. Listener 330 may be configured to intercept user actions, processes, tasks, and performance metrics on the respective computing system on which listener 330 resides. For example, listener 330 may record user actions (e.g., clicks, typed characters, locations, applications, active elements, times, etc.) on its respective computing system and then convert these into a suitable format to be provided to and stored in database server 350.

AI/ML server 360 facilitates incorporation of AI/ML models into automations. Pre-built AI/ML models, model templates, and various deployment options may make such functionality accessible even to those who are not data scientists. Deployed automations (e.g., RPA robots) may call AI/ML models from AI/ML server 360. Performance of the AI/ML models may be monitored, and be trained and improved using human-validated data. AI/ML server 360 may schedule and execute training jobs to train new versions of the AI/ML models.

AI/ML server 360 may store data pertaining to AI/ML models and ML packages for configuring various ML skills for a user at development time. An ML skill, as used herein, is a pre-built and trained ML model for a process, which may be used by an automation, for example. AI/ML server 360 may also store data pertaining to document understanding technologies and frameworks, algorithms and software packages for various AI/ML capabilities including, but not limited to, intent analysis, natural language processing (NLP), speech analysis, different types of AI/ML models, etc.

Indexer server 370, which is optional in some embodiments, stores and indexes the information logged by the robots. In certain embodiments, indexer server 370 may be disabled through configuration settings. In some embodiments, indexer server 370 uses ElasticSearch®, which is an open source project full-text search engine. Messages logged by robots (e.g., using activities like log message or write line) may be sent through the logging REST endpoint(s) to indexer server 370, where they are indexed for future utilization.

Figure 4:
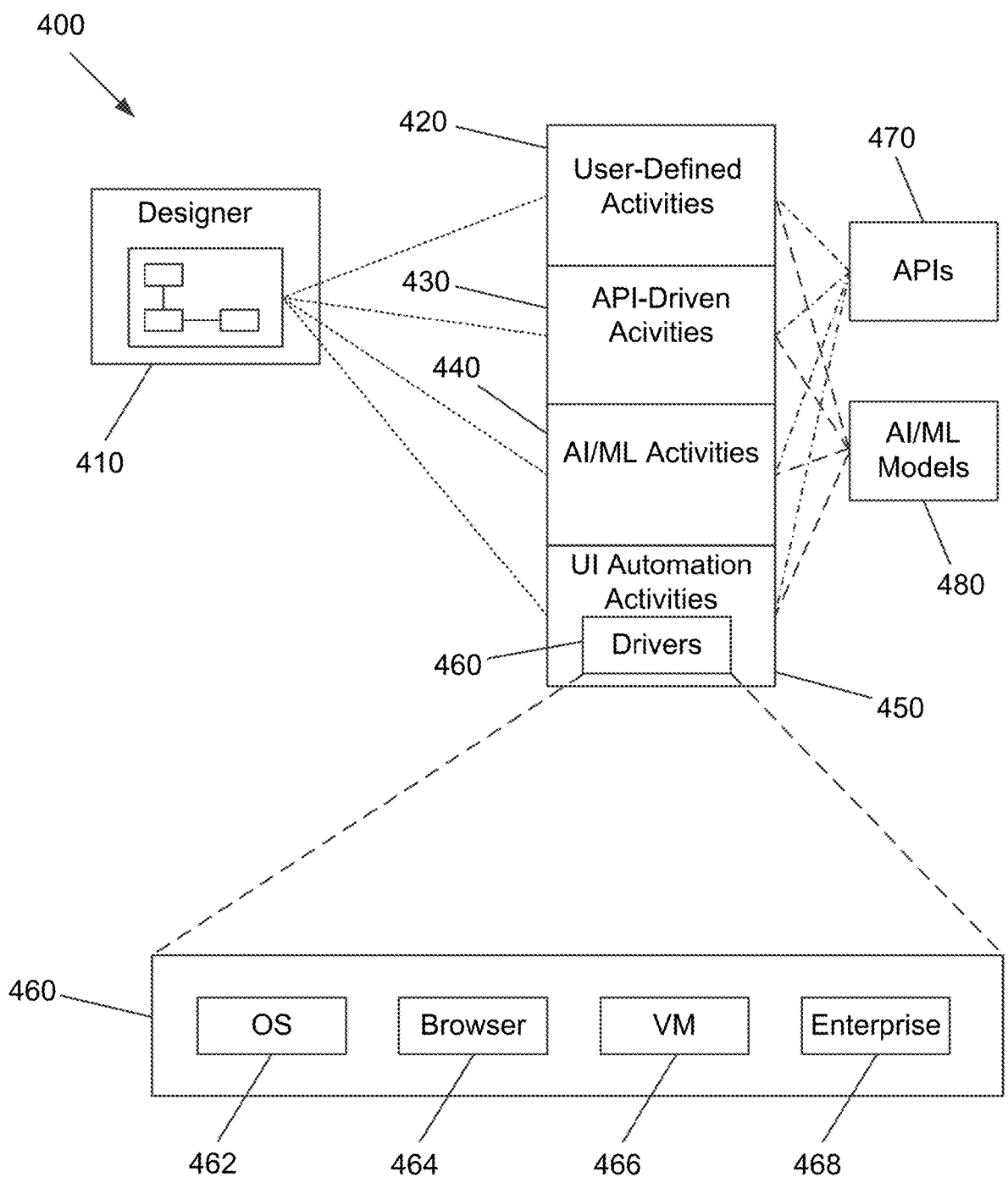
FIG. 4 is an architectural diagram illustrating the relationship between a designer, activities, and drivers, according to an embodiment of the present invention.

FIG. 4 is an architectural diagram illustrating the relationship 400 between a designer 410, activities 420, 430, 440, 450, drivers 460, APIs 470, and AI/ML models 480, according to an embodiment of the present invention. Per the above, a developer uses designer 410 to develop workflows that are executed by robots. The various types of activities may be displayed to the developer in some embodiments. Designer 410 may be local to the user's computing system or remote thereto (e.g., accessed via VM or a local web browser interacting with a remote web server). Workflows may include user-defined activities 420, API-driven activities 430, AI/ML activities 440, and/or UI automation activities 450. User-defined activities 420 and API-driven activities 440 interact with applications via their APIs. User-defined activities 420 and/or AI/ML activities 440 may call one or more AI/ML models 480 in some embodiments, which may be located locally to the computing system on which the robot is operating and/or remotely thereto.

Some embodiments are able to identify non-textual visual components in an image. CV may be performed at least in part by AI/ML model(s) 480. Some CV activities pertaining to such components may include, but are not limited to, extracting of text from segmented label data using OCR, fuzzy text matching, cropping of segmented label data using ML, comparison of extracted text in label data with ground truth data, etc. In some embodiments, there may be hundreds or even thousands of activities that may be implemented in user-defined activities 420. However, any number and/or type of activities may be used without deviating from the scope of the invention.

UI automation activities 450 are a subset of special, lower-level activities that are written in lower-level code and facilitate interactions with the screen. UI automation activities 450 facilitate these interactions via drivers 460 that allow the robot to interact with the desired software. For instance, drivers 460 may include operating system (OS) drivers 462, browser drivers 464, VM drivers 466, enterprise application drivers 468, etc. One or more of AI/ML models 480 may be used by UI automation activities 450 in order to perform interactions with the computing system in some embodiments. In certain embodiments, AI/ML models 480 may augment drivers 460 or replace them completely. Indeed, in certain embodiments, drivers 460 are not included.

Drivers 460 may interact with the OS at a low level looking for hooks, monitoring for keys, etc. via OS drivers 462. Drivers 460 may facilitate integration with Chrome®, IE®, Citrix®, SAP®, etc. For instance, the "click" activity performs the same role in these different applications via drivers 460.

Figure 5:
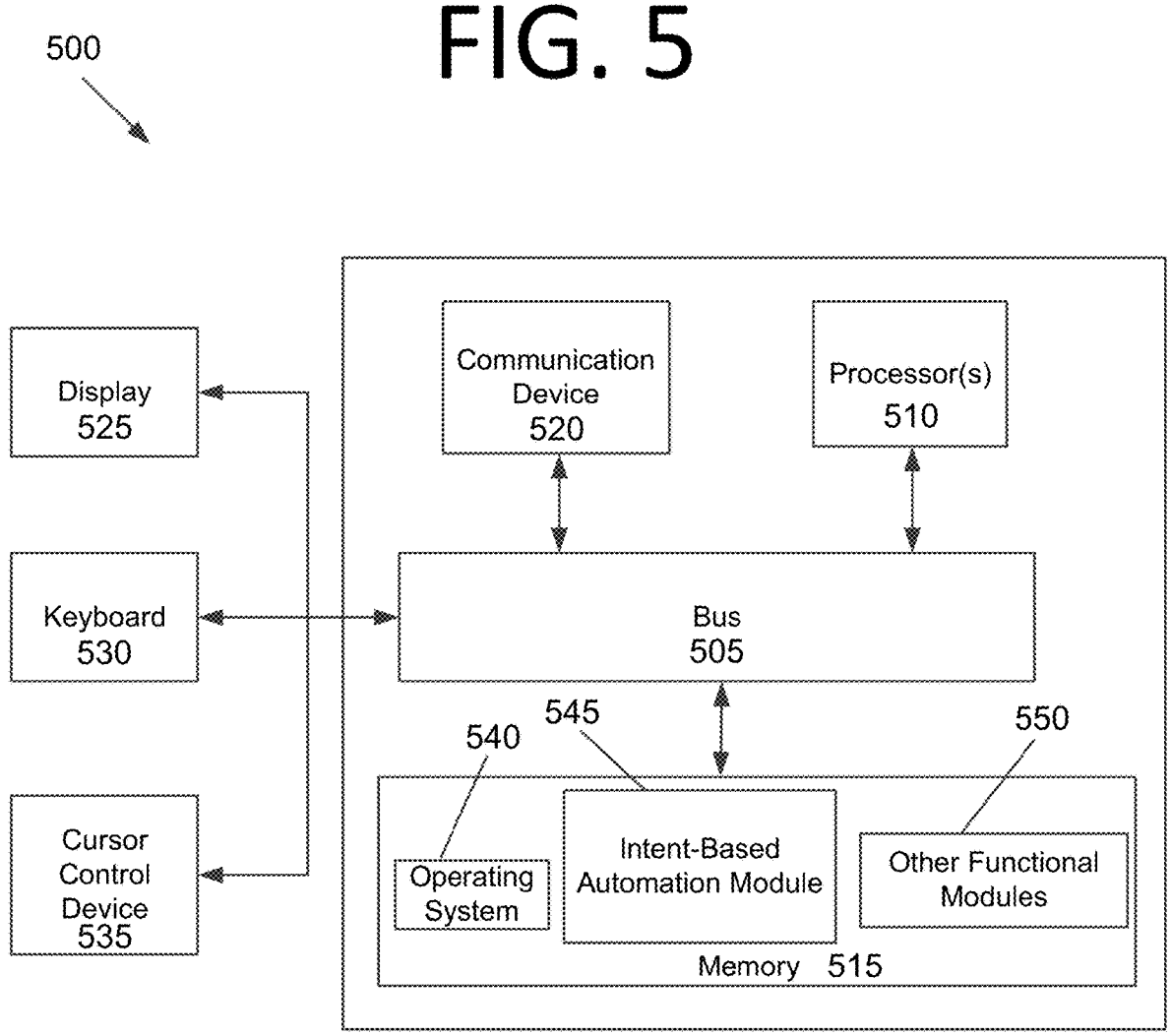
FIG. 5 is an architectural diagram illustrating a computing system configured to perform intent-based automation, according to an embodiment of the present invention.

FIG. 5 is an architectural diagram illustrating a computing system 500 configured to perform intent-based automation, according to an embodiment of the present invention. In some embodiments, computing system 500 may be one or more of the computing systems depicted and/or described herein. In certain embodiments, computing system 500 may be part of a hyper-automation system, such as that shown in FIGS. 1 and 2. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideB and (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an intent-based automation module 545 that is configured to perform all or part of the processes described herein or derivatives thereof. Computing system 500 may include one or more additional functional modules 550 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6A:
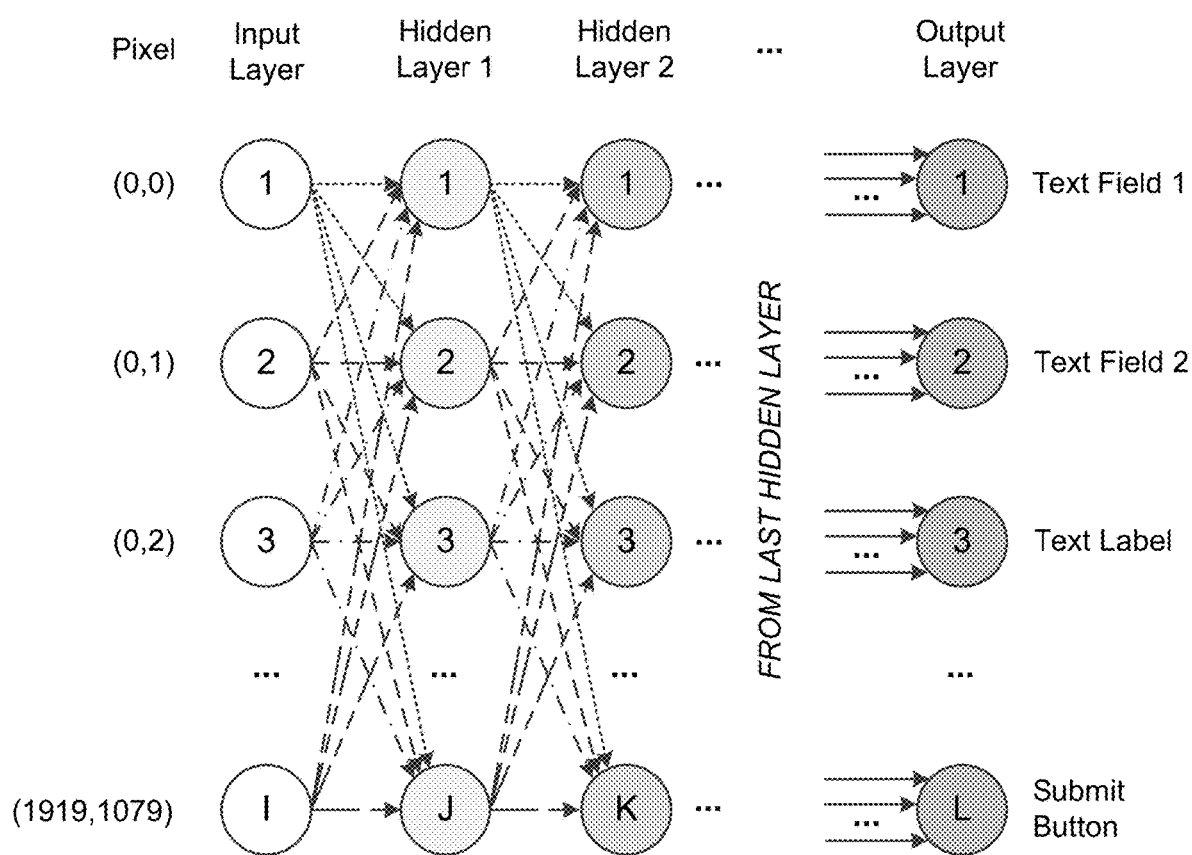
FIG. 6A illustrates an example of a neural network that has been trained to recognize graphical elements in an image, according to an embodiment of the present invention.

Various types of AI/ML models may be trained and deployed without deviating from the scope of the invention. For instance, FIG. 6A illustrates an example of a neural network 600 that has been trained to recognize graphical elements in an image, according to an embodiment of the present invention. Here, neural network 600 receives pixels of a screenshot image of a 1920×1080 screen as input for input "neurons" 1 to I of the input layer. In this case, I is 2,073,600, which is the total number of pixels in the screenshot image.

Neural network 600 also includes a number of hidden layers. Both DLNNs and shallow learning neural networks (SLNNs) usually have multiple layers, although SLNNs may only have one or two layers in some cases, and normally fewer than DLNNs. Typically, the neural network architecture includes an input layer, multiple intermediate layers, and an output layer, as is the case in neural network 600.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 6A, pixels provided as the input layer are fed as inputs to the J neurons of hidden layer 1. While all pixels are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the invention.

Hidden layer 2 receives inputs from hidden layer 1, hidden layer 3 receives inputs from hidden layer 2, and so on for all hidden layers until the last hidden layer provides its outputs as inputs for the output layer. It should be noted that numbers of neurons I, J, K, and L are not necessarily equal, and thus, any desired number of layers may be used for a given layer of neural network 600 without deviating from the scope of the invention. Indeed, in certain embodiments, the types of neurons in a given layer may not all be the same.

Neural network 600 is trained to assign a confidence score to graphical elements believed to have been found in the image. In order to reduce matches with unacceptably low likelihoods, only those results with a confidence score that meets or exceeds a confidence threshold may be provided in some embodiments. For instance, if the confidence threshold is 80%, outputs with confidence scores exceeding this amount may be used and the rest may be ignored. In this case, the output layer indicates that two text fields, a text label, and a submit button were found. Neural network 600 may provide the locations, dimensions, images, and/or confidence scores for these elements without deviating from the scope of the invention, which can be used subsequently by an RPA robot or another process that uses this output for a given purpose.

It should be noted that neural networks are probabilistic constructs that typically have a confidence score. This may be a score learned by the AI/ML model based on how often a similar input was correctly identified during training. For instance, text fields often have a rectangular shape and a white background. The neural network may learn to identify graphical elements with these characteristics with a high confidence. Some common types of confidence scores include a decimal number between 0 and 1 (which can be interpreted as a percentage of confidence), a number between negative co and positive co, or a set of expressions (e.g., "low," "medium," and "high"). Various post-processing calibration techniques may also be employed in an attempt to obtain a more accurate confidence score, such as temperature scaling, batch normalization, weight decay, negative log likelihood (NLL), etc.

"Neurons" in a neural network are mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 6B:
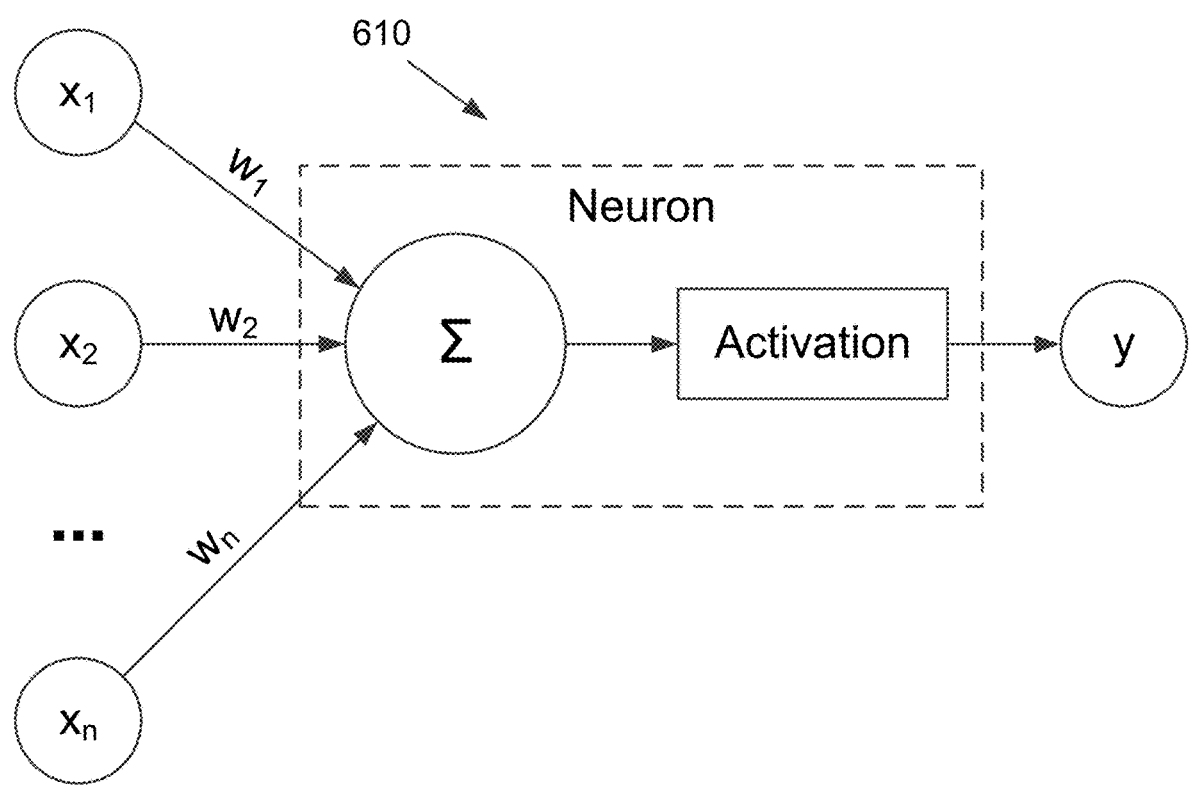
FIG. 6B illustrates an example of a neuron, according to an embodiment of the present invention.

An example of a neuron 610 is shown in FIG. 6B. Inputs $x_1, x_2, \ldots, x_n$ from a preceding layer are assigned respective weights $w_1, w_2, \ldots w_n$. Thus, the collective input from preceding neuron 1 is $w_1 x_1$. These weighted inputs are used for the neuron's summation function modified by a bias, such as:

$$\sum_{i=1}^{m}(w_i x_i) + \text{bias} \tag{1}$$

This summation is compared against an activation function $f(x)$ to determine whether the neuron "fires". For instance, $f(x)$ may be given by:

$$f(x) = \begin{cases} 1 & \text{if } \sum wx + \text{bias} \geq 0 \\ 0 & \text{if } \sum wx + \text{bias} < 0 \end{cases} \tag{2}$$

The output y of neuron 710 may thus be given by:

$$y = f(x) \sum_{i=1}^{m} (w_i x_i) + \text{bias} \quad (3)$$

In this case, neuron 610 is a single-layer perceptron. However, any suitable neuron type or combination of neuron types may be used without deviating from the scope of the invention. It should also be noted that the ranges of values of the weights and/or the output value(s) of the activation function may differ in some embodiments without deviating from the scope of the invention.

The goal, or "reward function" is often employed, such as for this case the successful identification of graphical elements in the image. A reward function explores intermediate transitions and steps with both short-term and long-term rewards to guide the search of a state space and attempt to achieve a goal (e.g., successful identification of graphical elements, successful identification of a next sequence of activities for an RPA workflow, etc.).

During training, various labeled data (in this case, images) are fed through neural network 600. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide indications of where non-identified graphical elements are, provide corrections of misidentified graphical elements, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer i=1, . . . , N of the network, with the output at a given layer first multiplied by a synaptic matrix $W_i$, and with a bias vector $b_i$ added. The network output o, given by $$o = f_N(W_N f_{N-1}(W_{N-1} f_{N-2}( \ldots f_1(W_1 x + b_1) \ldots ) + b_{N-1}) + b_N) \quad (4)$$

In some embodiments, o is compared with a target output t, resulting in an error $E = \frac{1}{2} \|o - t\|^2$, which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o−t. This global error is then propagated backwards giving local errors for weight updates with computations similar to, but not exactly the same as, those used for forward propagation. In particular, the backpropagation step typically requires an activity function of the form $p_j(n_j) = f_j'(n_j)$, where $n_j$ is the network activity at layer j (i.e., $n_j = W_j o_{j-1} + b_j$) where $o_j = f_j(n_j)$ and the apostrophe ' denotes the derivative of the activity function $f$.

The weight updates may be computed via the formulae:

$$d_j = \begin{cases} (o-t) \circ p_j(n_j), & j = N \\ W_{j+1}^T d_{j+1} \circ p_j(n_j), & j < N \end{cases} \quad (5)$$

$$\frac{\partial E}{\partial W_{j+1}} = d_{j+1}(o_j)^T \quad (6)$$

$$\frac{\partial E}{\partial b_{j+1}} = d_{j+1} \quad (7)$$

$$W_j^{new} = W_j^{old} - \eta \frac{\partial E}{\partial W_j} \quad (8)$$

$$b_j^{new} = b_j^{old} - \eta \frac{\partial E}{\partial b_j} \quad (9)$$

where $\circ$ denotes a Hadamard product (i.e., the element-wise product of two vectors), $^T$ denotes the matrix transpose, and $o_j$ denotes $f_j(W_j o_{j-1} + b_j)$, with $o_0 = x$. Here, the learning rate $\eta$ is chosen with respect to machine learning considerations. Below, $\eta$ is related to the neural Hebbian learning mechanism used in the neural implementation. Note that the synapses W and b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the invention. Once trained on the training data, the AI/ML model may be tested on a set of evaluation data that the AI/ML model has not encountered before. This helps to ensure that the AI/ML model is not "over fit" such that it identifies graphical elements in the training data well, but does not generalize well to other images.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model.

In certain embodiments, a collection of trained AI/ML models may be used to accomplish a task, such as employing an AI/ML model for each type of graphical element of interest, employing an AI/ML model to perform OCR, deploying yet another AI/ML model to recognize proximity relationships between graphical elements, employing still another AI/ML model to generate an RPA workflow based on the outputs from the other AI/ML models, etc. This may collectively allow the AI/ML models to enable semantic automation, for instance.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

Figure 7:
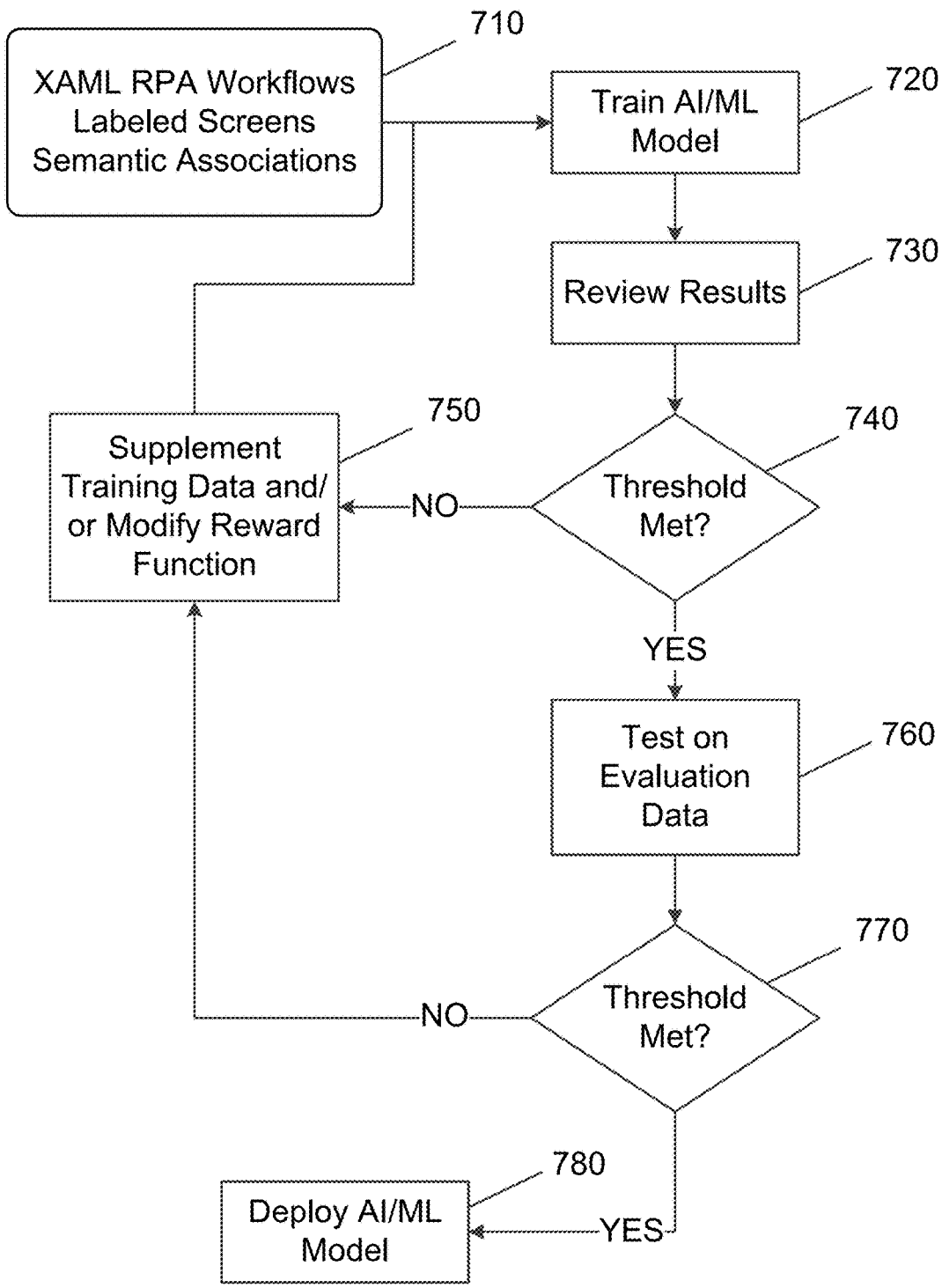
FIG. 7 is a flowchart illustrating a process for training AI/ML model(s), according to an embodiment of the present invention.
Figure 8A:
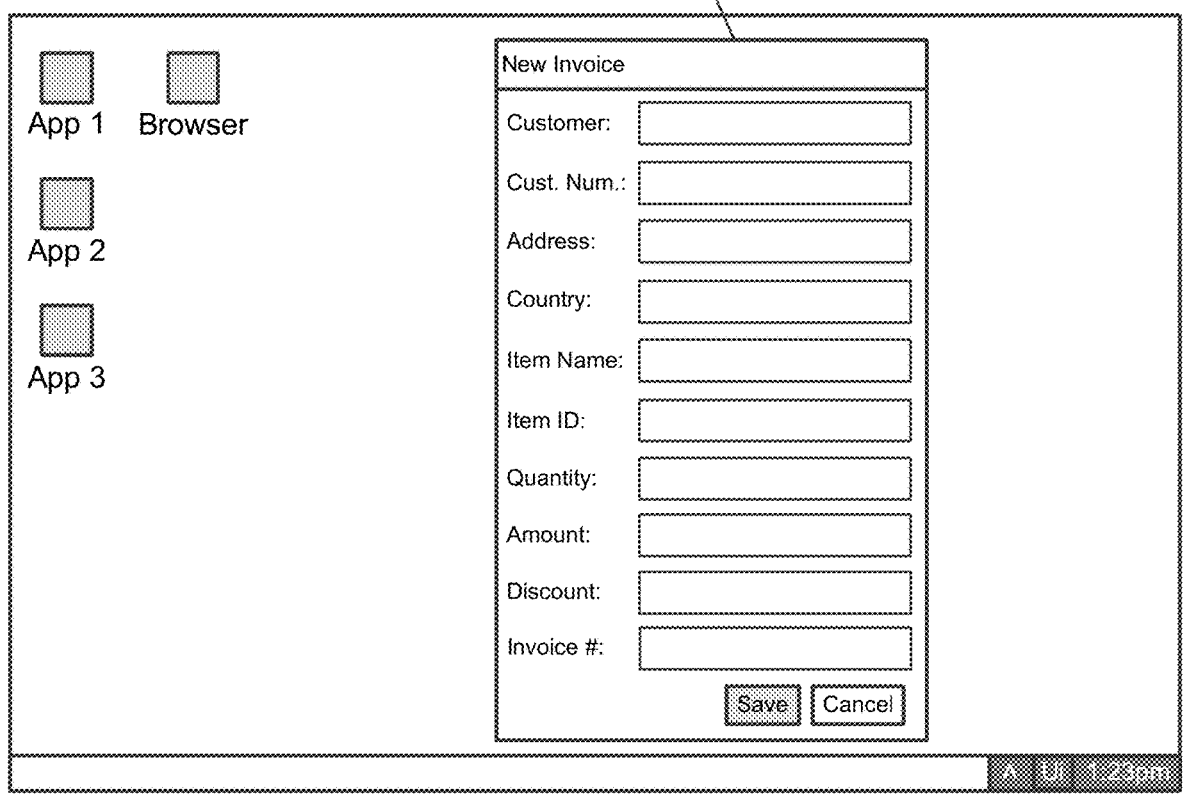
FIGS. 8A-E illustrate an example of the operation of an attended listener (or recorder), according to an embodiment of the present invention.
Figure 8B:
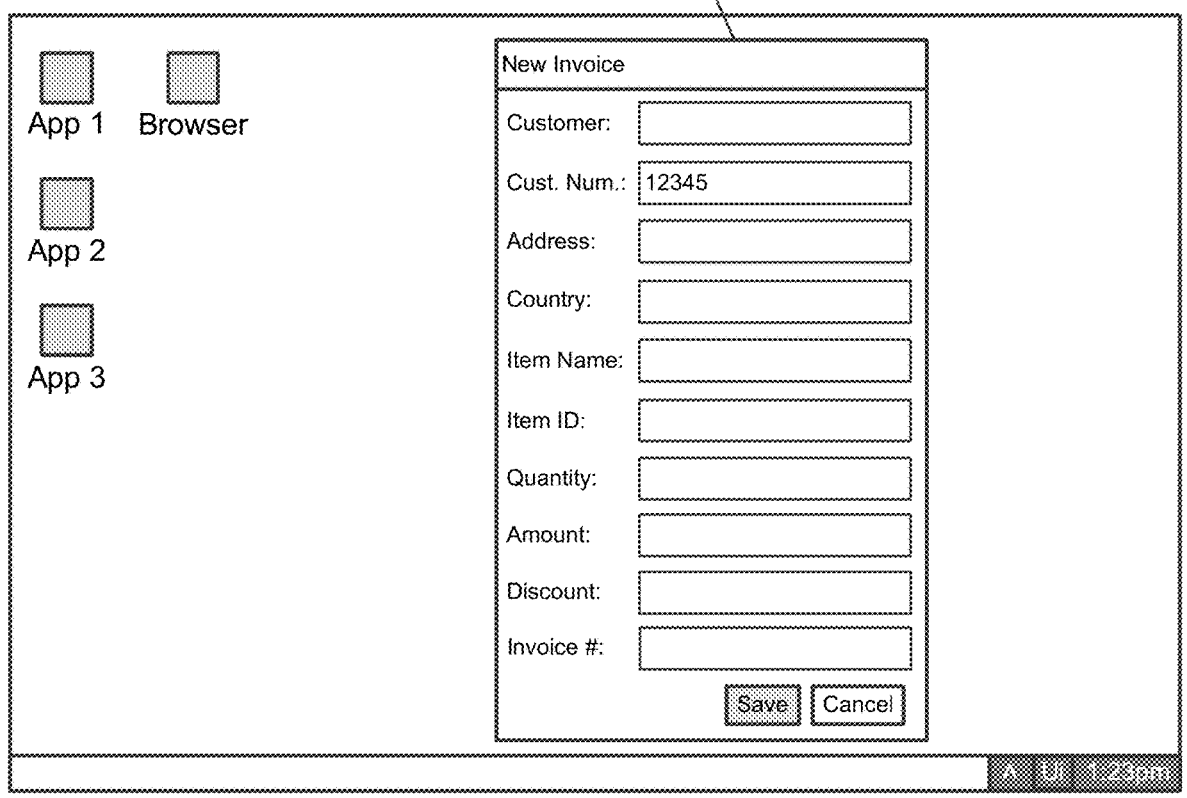
Figure 8C:
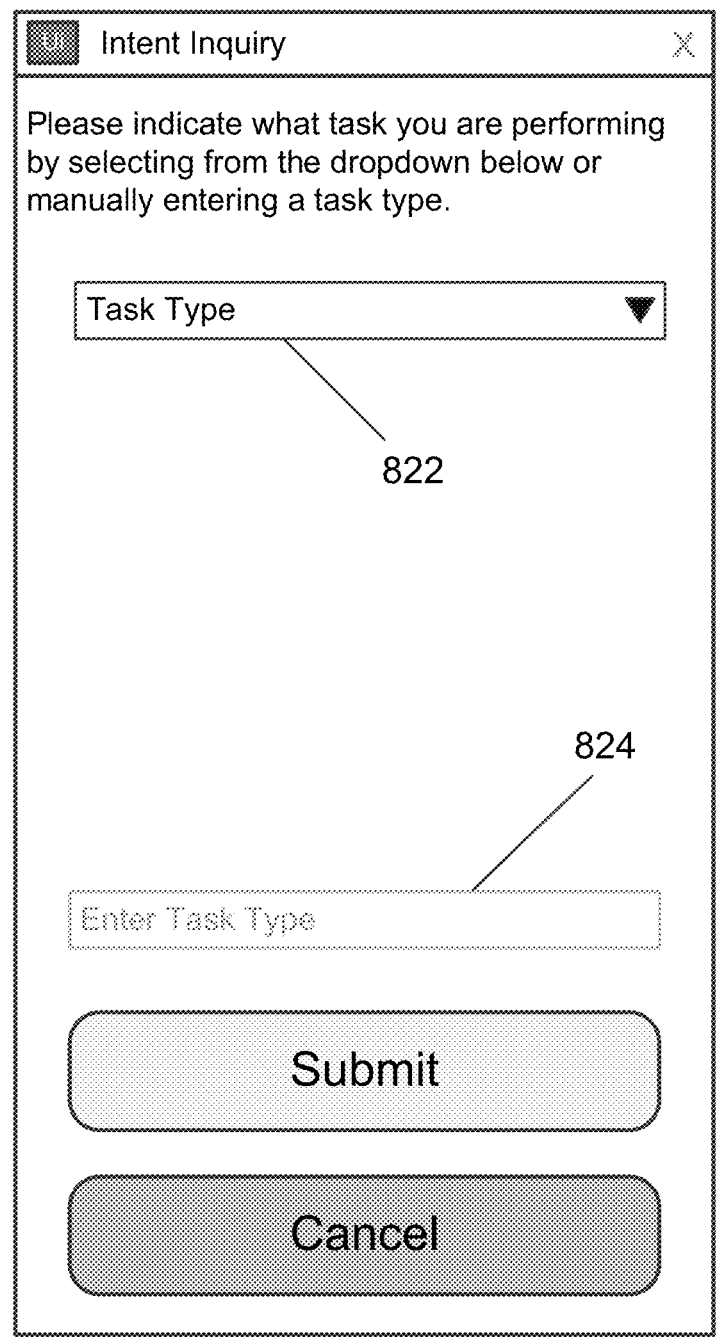
Figure 8D:
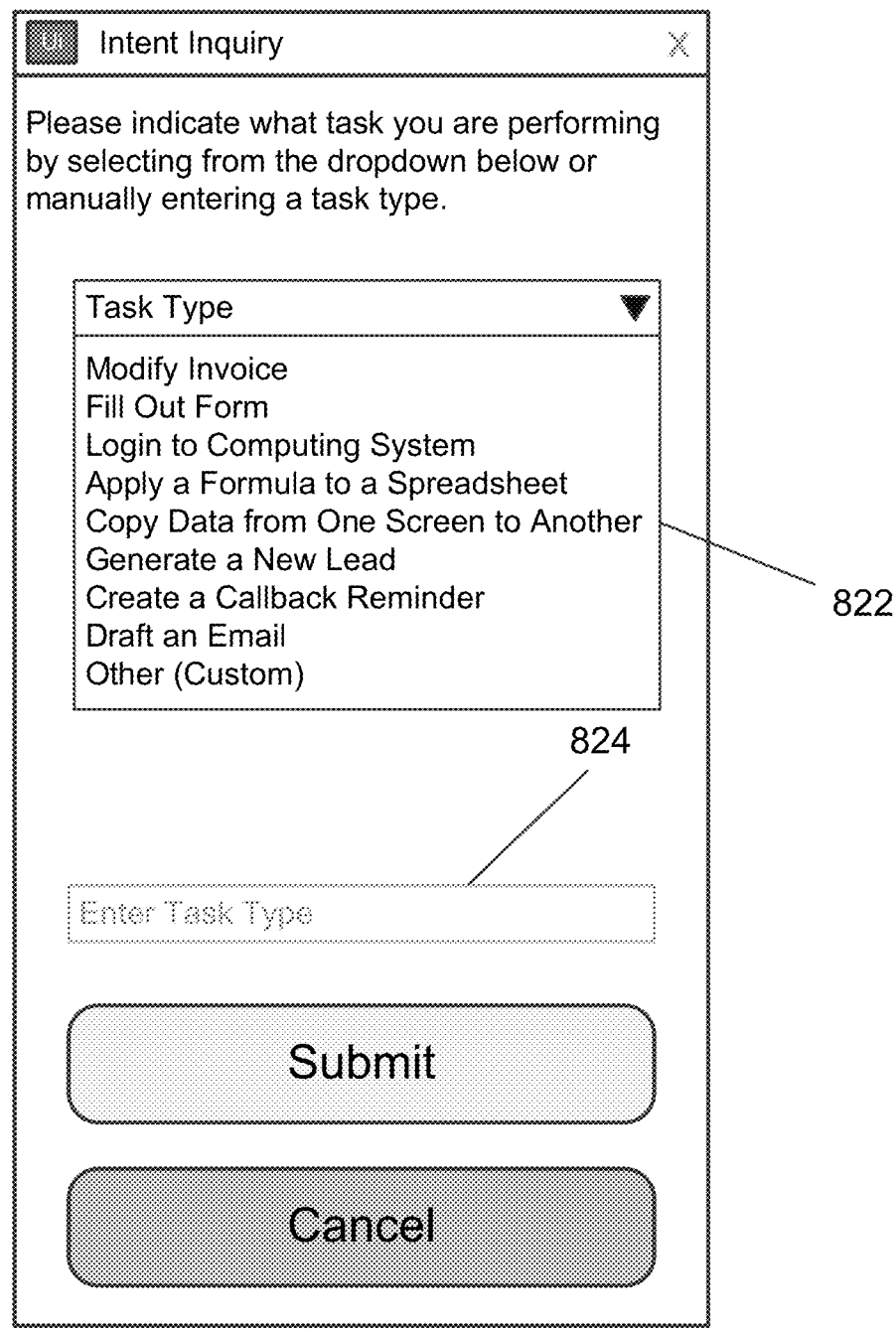
Figure 8E:
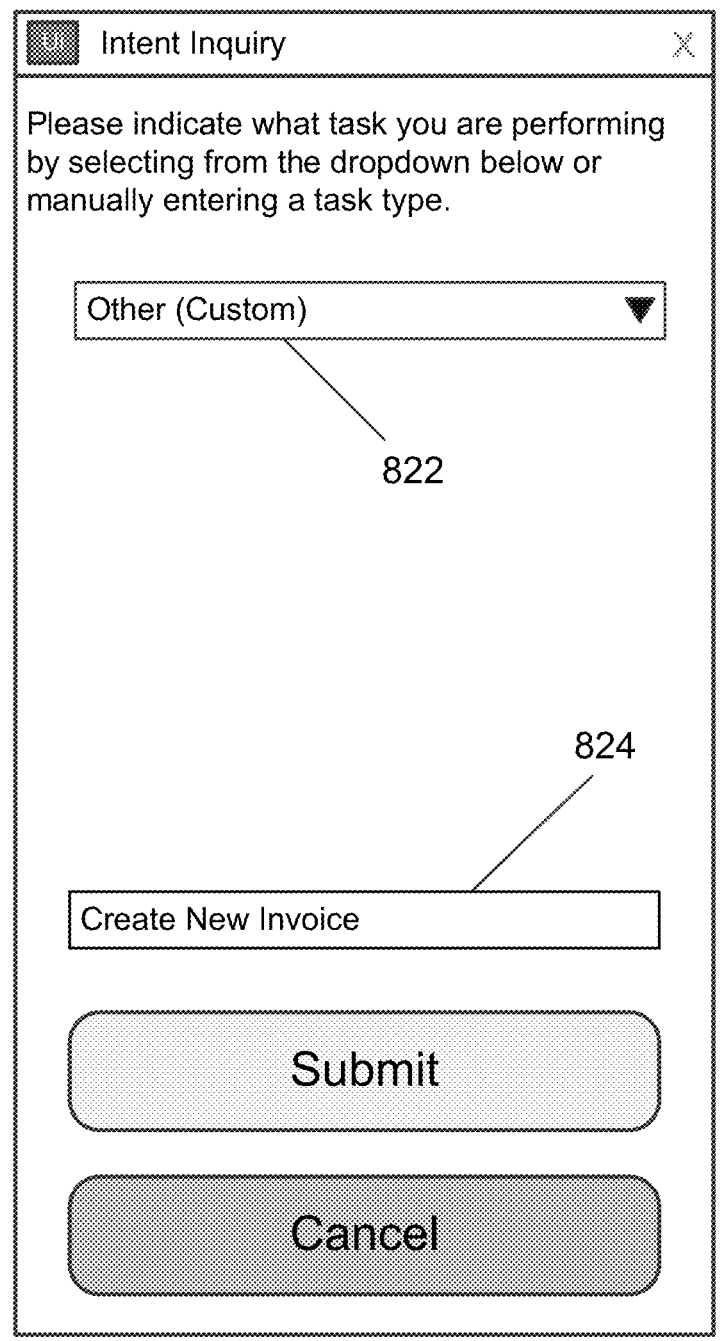

FIG. 7 is a flowchart illustrating a process 700 for training AI/ML model(s), according to an embodiment of the present invention. The process begins with providing training data, for instance, labeled data as shown in FIG. 7, such as labeled screens (e.g., with graphical elements and text identified), words and phrases, a "thesaurus" of semantic associations between words and phrases such that similar words and phrases for a given word or phrase can be identified, etc. at 710. The nature of the training data that is provided will depend on the objective that the AI/ML model is intended to achieve. The AI/ML model is then trained over multiple epochs at 720 and results are reviewed at 730.

If the AI/ML model fails to meet a desired confidence threshold at 740, the training data is supplemented and/or the reward function is modified to help the AI/ML model achieve its objectives better at 750 and the process returns to step 720. If the AI/ML model meets the confidence threshold at 740, the AI/ML model is tested on evaluation data at 760 to ensure that the AI/ML model generalizes well and that the AI/ML model is not over fit with respect to the training data. The evaluation data may include screens, source data, etc. that the AI/ML model has not processed before. If the confidence threshold is met at 770 for the evaluation data, the AI/ML model is deployed at 780. If not, the process returns to step 750 and the AI/ML model is trained further.

In order to train AI/ML model(s) to understand user intent for various tasks, user interactions with computing systems may be observed and data may be collected regarding what the user is doing. FIGS. 8A-E illustrate an example of the operation of an attended listener (or recorder), according to an embodiment of the present invention. In some embodiments, the attended listener may operate in a similar manner to the listeners discussed above with respect to FIGS. 1-3. The attended listener may record time-ordered screenshots, graphical elements in the UI, key presses made by the user, mouse click times and locations, the active element in the UI that the user has selected, the cursor location, currently running applications, windows, the active window, etc. See, for example, U.S. Pat. No. 11,080,548. In some embodiments, this information may be obtained via APIs from the operating system and/or application(s) that are currently running. The information may be obtained in real-time or near-real time so the actions of the user can be processed on the fly.

A screen 800 includes a new invoice creation window 810. See FIG. 8A. The user then enters a customer number into the associated field in the new invoice creation window. See FIG. 8B. The attended listener observes the user's interactions with the computing system and asks the user for further information regarding what he or she intends to do via an intent inquiry window 820. See FIG. 8C. Intent inquiry window 820 includes a task type selection dropdown 822 that includes tasks that have already been added and a task entry field 824 that allows the user to enter a new action if the appropriate action is not included in task type selection dropdown 822. When the user clicks on task type selection dropdown 822, the previously added tasks are shown. See FIG. 8D. If the appropriate task is not listed, the user may click on the "Other (Custom)" option, which enables text entry in task entry field 824. See FIG. 8E.

By using attended listeners and capturing user intent, training data for training AI/ML model(s) may be obtained. Also, the granular task flow is captured from the user for a larger overall task. The AI/ML model(s) may be trained in a similar manner to that discussed above with respect to FIG. 7, supplying this training data in step 710.

Once AI/ML model(s) have been trained to understand user intent, task flows may be fed to a task mining tool employing the AI/ML model(s), such as UiPath Task Mining™. The task mining tool feeds this information to the AI/ML model(s). Image and/or text information is vectorized and clustered, and a classifier then maps user actions to respective intent predictions, together with a confidence. In some embodiments, the mapping is not performed if the confidence scope is below a minimum threshold (e.g., 75%, 90%, 99%, etc.). The task mining tool, which may be part of an RPA designer application or a separate application in some embodiments, may provide the intent mappings to the RPA designer application in some embodiments. For instance, RPA designer activities for performing the actions associated with the task (e.g., Excel.WriteCell, SalesForce.InsertRecord, etc.) may then be automatically added to an RPA workflow that accomplishes the task.

The associated activities developed by the RPA developer may be stored as templates to be offered for activities for actions. For instance, if a user clicks a button, the logic created by the RPA developer may be used to propose button press activities for future RPA workflows. Such templates may be stored in a cloud-based repository in some embodiments, and the breadth, robustness, and accuracy of the system may grow over time as more and more mappings and activities are stored therein. These activities and mappings may also be used to train AI/ML model(s) to automatically understand series of user actions and intents and to propose an associated workflow that accomplishes a broader overall task.

In order to obtain data and train the AI/ML model(s), a listener may acquire user data and request labels from the user. Additionally or alternatively, image data from workflows that RPA robots are running may be used to provide correlations between images, actions, and the overall workflow. Classification may be performed using SimCLR, for example, which provides contrastive learning of visual representations. Another approach is to use CLIP. If a dataset of tasks and names of workflows is provided, CLIP can be used to learn associations between images and captions, providing a series of actions and a name (i.e., a caption) of a workflow. By learning associations, images are encoded into vectors and a database of captions and associated vectors is reviewed to find the closest vector to the image encoding. In some instances, a novel workflow may not have a caption, and a match can still be discovered by comparing the image vectors.

Figure 9:
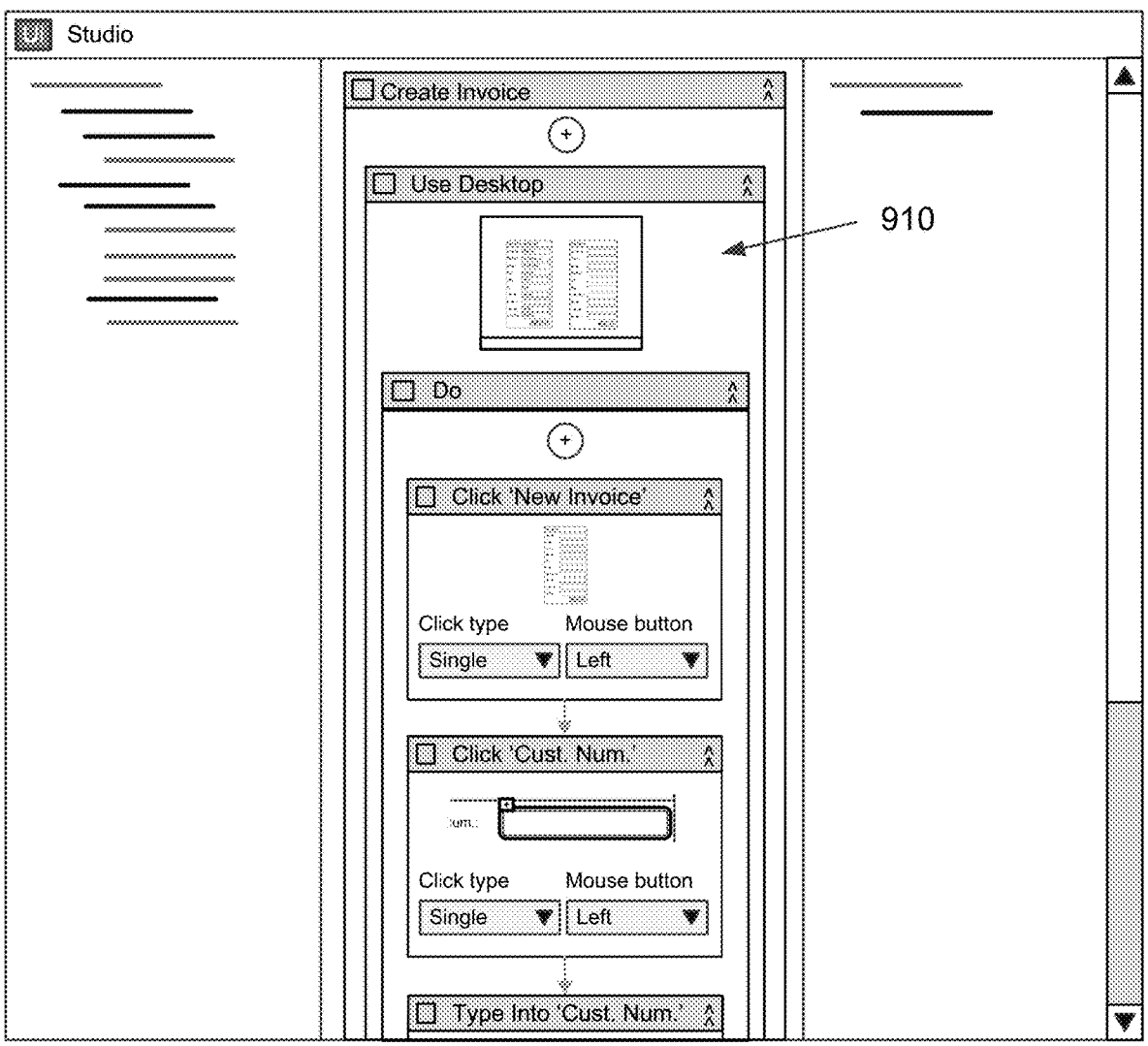
FIG. 9 illustrates a screenshot of an RPA designer application with automatically generated activities in an RPA workflow, according to an embodiment of the present invention.

FIG. 9 illustrates a screenshot of an RPA designer application 900 with automatically generated activities in an RPA workflow 910, according to an embodiment of the present invention. In this example, RPA workflow 910 is automatically generated based on the task mining discussed above. The user actions in creating a new invoice in this example are mapped to respective RPA activities. For instance, the workflow clicks on a new invoice option, clicks on the customer number field, types the customer number into the customer number field, etc. As the AI/ML model(s) become more accurate from a broader dataset and further training over time, the proposed RPA workflow may become accurate enough that it can be deployed as an automation for execution by an RPA robot automatically without developer review. However, developer review would likely be desirable at least initially to ensure that the AI/ML model(s) are proposing accurate activities to accomplish the task flow.

Figure 10:
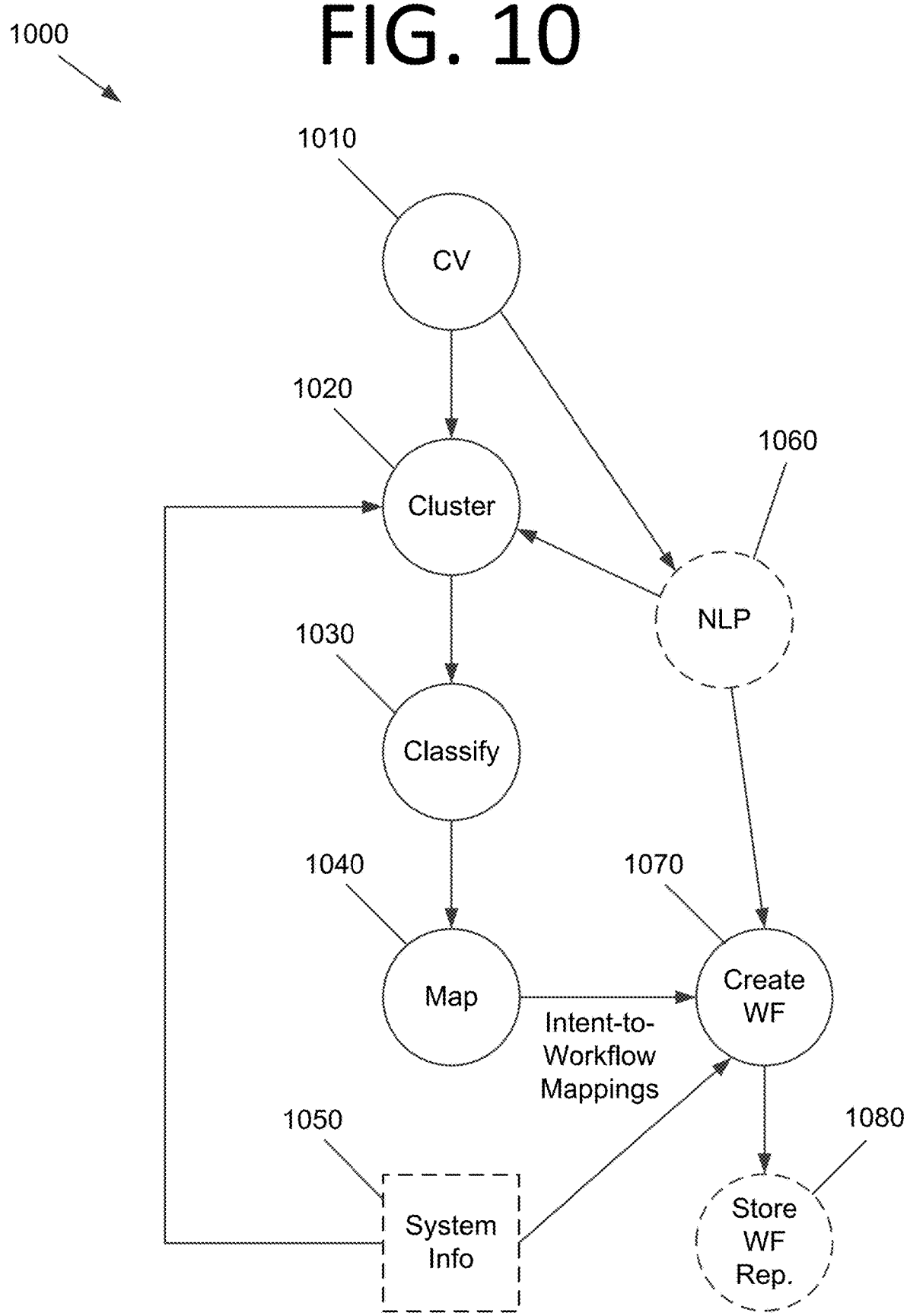
FIG. 10 is an architectural diagram illustrating an architecture of AI/ML models used for performing intent-based automation, according to an embodiment of the present invention.

FIG. 10 is an architectural diagram illustrating an architecture 1000 of AI/ML models used for performing intent-based automation, according to an embodiment of the present invention. A CV model 1010 performs computer vision functionality to identify graphical elements and perform text detection and recognition in screenshots. A clustering model 1020 clusters vector representations from CV model 1010. Clustering model 1020 may determine the distance to the nearest cluster as a measure of cluster membership. A classifier model 1030 trained on top of the representations from clustering model 1020 identifies predetermined types of tasks from screens and/or screen sequences. Clustering model 1020 provides one representation of a screen, but a vectorized representation may potentially contain more information than an identified cluster. Clusters make high-dimensional representations of screen data more interpretable.

In some embodiments, clustering may be further supplemented using system information 1050 and/or by performing natural language processing using an NLP model 1060 that processes recognized text from CV model 1010. Such information may make clustering more accurate. Also, UI descriptors, such as selectors, may provide information regarding how UI elements on screens are related.

Classifier model 1030 may use a sequence of clusters in a trace from clustering model 1020 and compares the cluster sequence to other cluster sequences from previously identified task types to determine closeness (e.g., by calculating distances from clusters). Alternatively, classifier model 1030 may represent the task using a vector for a sequence or a set of vectors representing screens, and then computing the vector distance to vectors for known task types.

The output of classifier model 1030 is then provided to a mapper model or algorithm 1040 that maps intent to a workflow/activities that accomplish an associated task flow. The intent-to-workflow mapping can then be used to create an associated RPA workflow in an RPA development application at 1070, for example. If the type does not match a previously identified type, activities for the steps of the workflow may be created and added to a workflow at 1070. The RPA developer can label the type of task that is being accomplished, a vector or clustered representation of the workflow may be added to an object repository at 1080, and this information can be used for mapping of future user task flows. Screenshots, system information 1050, and/or semantic information from NLP model 1060 may be used in some embodiments for automatically generating new activities for a previously unidentified task. For instance, such information may be used to create UI descriptors for activities that enable an RPA robot executing workflow actions to interact with UI elements on a screen (e.g., text fields, buttons, labels, menus, checkboxes, etc.).

Some embodiments use the information noted above to create selectors for activities. Selectors are a type of UI descriptor that may be used to detect UI elements in some embodiments. A selector has the following structure in some embodiments:

<node_1/><node_2/> . . . <node_N/>

The last node represents the GUI element of interest, and all previous nodes represent the parents of that element. <node_1> is usually referred to as a root node and represents the top window of the application.

Each node may have one or more attributes that assist with correct identification of a specific level of the selected application. Each node has the following format in some embodiments:

<*ui*_system attr_name_1='attr_value_1' . . . attr_name_*N*='attr_value_*N*'/>

Every attribute may have an assigned value, and attributes with constant values may be selected. This is because changes to the value of an attribute each time the application is started may lead to the selector not being able to correctly identify the associated element.

UI descriptors in some embodiments are an encapsulated data/struct format that includes UI element selector(s), anchor selector(s), CV descriptor(s), unified target descriptor(s), a screen image capture (context), an element image capture, other metadata (e.g., the application and application version), a combination thereof, etc. The encapsulated data/struct format may be extensible with future updates to the platform and is not limited to the above definition. Any suitable UI descriptor for identifying a UI element on a screen may be used without deviating from the scope of the invention. A unified target descriptor chains together multiple types of UI descriptors. A unified target descriptor may function like a finite state machine (FSM), where in a first context, a first UI descriptor mechanism is applied, in a second context, a second UI descriptor is applied, etc.

In some embodiments, fuzzy matching may be employed, where one or more attributes should match with a certain accuracy (e.g., a 70% match, an 80% match, a 99% match, etc.), within a certain range, using string metrics (e.g., a Levenshtein distance, a Hamming distance, a Jaro-Winkler distance, etc.), a combination thereof, etc. One of ordinary skill in the art will appreciate that the similarity measure may quantify an amount of similarity, as well as an amount of mismatch between two attribute values. Furthermore, in various embodiments, the similarity threshold may represent a maximum amount of mismatch or a minimum amount of similarity required for a match.

Depending on the chosen manner of computing the similarity measure, the similarity threshold can have various interpretations. For instance, the similarity threshold may indicate a maximum count of characters that can differ between the two strings or a fractional degree of mismatch calculated as a proportion of the total count of characters (e.g., combined string length). In some embodiments, the similarity threshold may be re-scaled to a predetermined interval, such as between 0 and 1, between 0 and 100, between 7 and 34, etc. In one nonlimiting example, a relatively high similarity threshold (e.g., close to 1 or 100%) indicates a requirement for an almost exact match, i.e., the value of the fuzzy attribute in the runtime target is only allowed to depart very slightly from the value of the respective attribute in the design time target. In contrast, when the similarity threshold is relatively low (e.g., close to 0), almost any values of the respective fuzzy attribute are considered as matching.

In certain embodiments, the matching tolerance may differ on a per-attribute basis. For instance, an exact match may be required for one or more attributes (e.g., it may be desired to find a certain exact name) and fuzzy matching may be performed for one or more other attributes. The number and/or type of attributes used from each graphical element detection technique may be custom-specified by the RPA developer in some embodiments.

In some embodiments, attributes may be stored as attribute-value pairs and/or attribute-value-tolerance pairs (e.g., fuzzy matching). Attribute-value pairs may indicate a name and a type of UI element represented by the respective node in some embodiments. However, one skilled in the art will appreciate that there may be multiple ways to represent a location of a specific node within a UI tree other than a list of attribute-value pairs without deviating from the scope of the invention.

These attribute-value pairs and/or attribute-value-tolerance pairs may be stored in a tag in some embodiments, and each tag may include a sequence of characters with the sequence book-ended by implementation-specific delimiters (e.g., beginning with "<" and ending with "/>"). Attribute-value pairs may indicate a name and a type of UI element represented by the respective node in some embodiments. However, one skilled in the art will appreciate that there may be multiple ways to represent a location of a specific node within a UI tree other than a list of attribute-value pairs without deviating from the scope of the invention.

To enable a successful and ideally unambiguous identification by an RPA robot, some embodiments represent each UI element using an element ID characterizing the respective UI element. The element ID in some embodiments indicates a location of a target node within a UI tree, where the target node represents the respective UI element. For instance, the element ID may identify a target node/UI element as a member of a selected subset of nodes. The selected subset of nodes may form a genealogy, i.e., a line of descent through the UI tree where each node is either an ancestor or a descendant of another node.

In some embodiments, the element ID includes an ordered sequence of node indicators, the sequence tracing a genealogical path through the UI tree, and the path ending in the respective target node/UI element. Each node indicator may represent a member of an object hierarchy of the respective UI and its position within the sequence consistent with the respective hierarchy. For instance, each member of the sequence may represent a descendant (e.g., a child node) of the previous member, and may have the following member as a descendant (e.g., a child node). In one HyperText Markup Language (HTML) example, an element ID representing an individual form field may indicate that the respective form field is a child of an HTML form, which in turn is a child of a specific section of a webpage, etc. The genealogy does not need to be complete in some embodiments.

Some embodiments may use one or more multi-anchor matching attributes. Anchors are other UI elements that can be used to assist in uniquely identifying a target UI element. For instance, if multiple text fields are included in a UI, searching for a text field alone is insufficient to uniquely identify a given text field. Accordingly, some embodiments look for additional information in order to uniquely identify a given UI element. Using the text field example, a text field for entering a first name may appear to the right of the label "First Name". This first name label may be set as an "anchor" to help to uniquely identify the text field, which is the "target".

Various positional and/or geometric associations between the target and the anchor may be used in some embodiments, potentially within one or more tolerances, to uniquely identify the target. For instance, the center of bounding boxes for the anchor and the target may be used to define a line segment. This line segment could then be required to have a certain length within a tolerance and/or slope within a tolerance to uniquely identify the target using the target/anchor pair. However, any desired position of the location associated with the target and/or anchors may be used in some embodiments without deviating from the scope of the invention. For instance, the point for drawing line segments may be in the center, upper left corner, upper right corner, lower left corner, lower right corner, any other location on the border of the bounding box, any location within the bounding box, a location outside of the bounding box as identified in relation to the bounding box properties, etc. In certain embodiments, the target and one or more anchors may have different locations within or outside of their bounding boxes that are used for geometric matching.

Per the above, a single anchor may not always be sufficient to uniquely identify a target element on a screen with a certain confidence. For instance, consider a web form where two text field for entering a first name appear to the right of respective labels "First Name" in different locations on the screen. In this example, one or more additional anchors may be useful to uniquely identify a given target. The geometric properties between the anchors and the target (e.g., line segment lengths, angles, and/or relative locations with tolerances) may be used to uniquely identify the target. The user may be required to continue to add anchors until a match strength for the target exceeds the threshold.

It should be noted that the "intent" is not necessarily a text description. The objective of the intent is to infer a goal of the task so an RPA robot or other software can achieve the same end goal. The same actions that the user used to accomplish the task are not necessarily the actions used by the workflow, and different numbers of steps may be used. However, the same end goal is accomplished (e.g., logging into an application, filling out a form, etc.).

Figure 11:
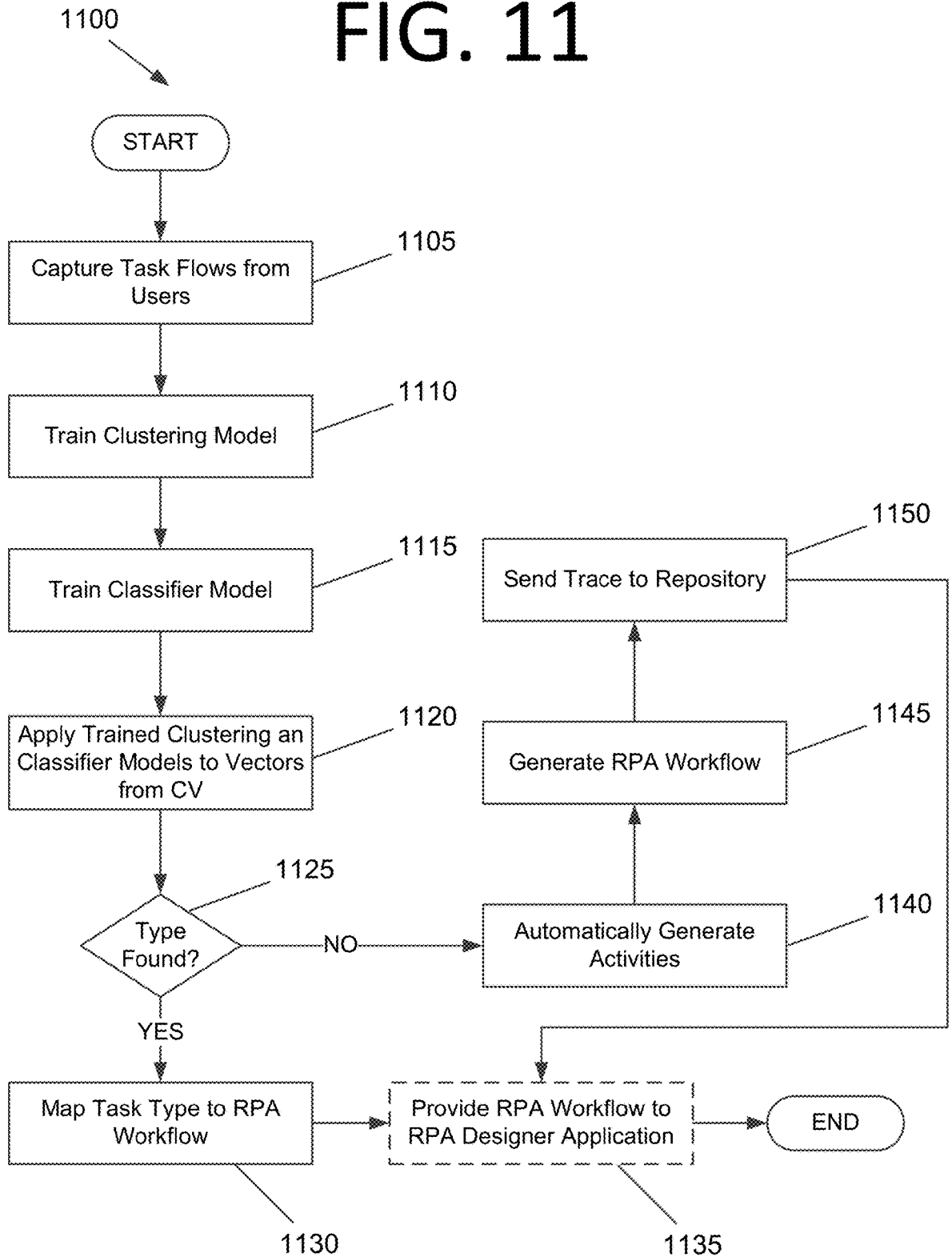
FIG. 11 is a flowchart illustrating a process for performing intent-based automation, according to an embodiment of the present invention.

FIG. 11 is a flowchart illustrating a process 1100 for performing intent-based automation, according to an embodiment of the present invention. The process begins with capturing task flows from users at 1105. In some embodiments, this may involve users manually providing intent descriptions via an attended listener, as well as capturing screenshots, API calls, key presses, mouse click information, etc. However, in certain embodiments, such information may not be provided.

This information is then used to train a clustering AI/ML model at 1110 to cluster information from screens into a trace of a sequence of clusters for the screens. A classifier AI/ML model is then trained to classify the traces of sequences of clusters into task types at 1115. In some embodiments, the classifier AI/ML model is configured to compare the sequence of clusters in the trace from the clustering AI/ML model to other sequences of clusters representing traces from previously identified task types to determine the task type. In certain embodiments, the classifier AI/ML model is configured to represent individual screens or the sequence of screens as vectors and compute a vector distance from vectors for previously identified task types.

The trained clustering AI/ML model and classifier AI/ML model are then applied to vectorized information for a sequence of screens representing a captured task flow from a CV model at 1120. More specifically, the clustering AI/ML model is run on vector representations of the sequence of screens pertaining to the captured task flow, taking the vectorized information as input and producing a sequence of clusters in a trace as an output. The classifier AI/ML model is then run on the sequence of clusters in the trace from the clustering AI/ML model, taking the sequence of clusters in the trace as input and providing a task type (if identified) as an output. When the classifier AI/ML model identifies a task type from the sequence of clusters in the trace at 1125, the classified task type is mapped to an RPA workflow that accomplishes an intent of the captured task flow at 1130. In some embodiments, the mapping includes using system information, semantic information from an NLP model, or both, to provide context to the classified task type. The RPA workflow may then be provided to an RPA designer application and be automatically created or opened therein.

However, when the classifier AI/ML model does not identify a task type from the sequence of clusters in the trace at 1125, activities for actions in the task flow are automatically generated at 1140. This may be performed using the sequence of screens, system information, semantic information from an NLP model, or any combination thereof, for example. An RPA workflow including the activities is generated at 1145, and the trace of the sequence of clusters is sent to a repository for future mappings at 1150. The process may then proceed to step 1135. The process steps performed in FIG. 11 may be performed by a computer program, encoding instructions for the processor(s) to perform at least part of the process(es) described in FIG. 11, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 11, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A non-transitory computer-readable medium storing a computer program for performing intent-based automation, the computer program configured to cause at least one processor to:
   run a clustering artificial intelligence (AI)/machine learning (ML) model on vector representations of a sequence of screens pertaining to a captured task flow to produce a trace comprising a sequence of clusters; and
   run a classifier AI/ML model on the sequence of clusters in the trace from the clustering AI/ML model; and
   when the classifier AI/ML model identifies a task type from the sequence of clusters in the trace:
      map the classified task type to a robotic process automation (RPA) workflow that accomplishes an intent of the captured task flow.

2. The non-transitory computer-readable medium of claim 1, wherein the classifier AI/ML model is configured to compare the sequence of clusters in the trace from the clustering AI/ML model to other sequences of clusters representing traces from previously identified task types to determine the task type.

3. The non-transitory computer-readable medium of claim 1, wherein the classifier AI/ML model is configured to represent individual screens or the sequence of screens as vectors and compute a vector distance from vectors for previously identified task types.

4. The non-transitory computer-readable medium of claim 1, wherein the clustering AI/ML model receives and uses system information, semantic information from a natural language processing (NLP) model, or both, to provide context to the classified task type.

5. The non-transitory computer-readable medium of claim 4, wherein the system information comprises user interaction events, application programming interface (API)

events, operating system (OS)/document object model (DOM) events, user interaction/input types, location data, an indication of which mouse button was pressed, an application or process name, a UI descriptor, or any combination thereof.

6. The non-transitory computer-readable medium of claim 1, wherein the computer program is further configured to cause the at least one processor to:
automatically generate or open the RPA workflow that accomplishes the intent of the captured task flow in an RPA designer application.

7. The non-transitory computer-readable medium of claim 1, wherein when the classifier AI/ML model does not identify a task type from the sequence of clusters in the trace, the computer program is further configured to cause the at least one processor to:
automatically generate activities for actions in the task flow.

8. The non-transitory computer-readable medium of claim 7, wherein the automatic generation of the activities comprises creating user interface (UI) descriptors for the generated activities using the sequence of screens, system information, semantic information from a natural language processing (NLP) model, or any combination thereof.

9. The non-transitory computer-readable medium of claim 7, wherein the computer program is further configured to cause the at least one processor to:
generate an RPA workflow comprising the generated activities.

10. The non-transitory computer-readable medium of claim 9, wherein the computer program is further configured to cause the at least one processor to:
send the trace of the sequence of clusters in the trace to a repository for future mappings.

11. A computer-implemented method, comprising:
running a clustering artificial intelligence (AI)/machine learning (ML) model on vector representations of a sequence of screens pertaining to a captured task flow to produce a trace comprising a sequence of clusters; and
running a classifier AI/ML model on the sequence of clusters in the trace from the clustering AI/ML model
when the classifier AI/ML model identifies a task type from the sequence of clusters in the trace:
mapping the classified task type to a robotic process automation (RPA) workflow that accomplishes an intent of the captured task flow, and
when the classifier AI/ML model does not identify a task type from the sequence of clusters in the trace:
automatically generating activities for actions in the task flow.

12. The computer-implemented method of claim 11, wherein the classifier AI/ML model is configured to compare the sequence of clusters in the trace from the clustering AI/ML model to other sequences of clusters representing traces from previously identified task types to determine the task type.

13. The computer-implemented method of claim 11, wherein the classifier AI/ML model is configured to represent individual screens or the sequence of screens as vectors and compute a vector distance from vectors for previously identified task types.

14. The computer-implemented method of claim 11, wherein the clustering AI/ML model receives and uses system information, semantic information from a natural language processing (NLP) model, or both, to provide context to the classified task type.

15. The computer-implemented method of claim 14, wherein the system information comprises user interaction events, application programming interface (API) events, operating system (OS)/document object model (DOM) events, user interaction/input types, location data, an indication of which mouse button was pressed, an application or process name, a UI descriptor, or any combination thereof.

16. The computer-implemented method of claim 11, further comprising:
automatically generating or opening the RPA workflow that accomplishes the intent of the captured task flow in an RPA designer application.

17. The computer-implemented method of claim 11, wherein the automatic generation of the activities comprises creating user interface (UI) descriptors for the generated activities using the sequence of screens, system information, semantic information from a natural language processing (NLP) model, or any combination thereof.

18. The computer-implemented method of claim 11, further comprising:
sending the trace of the sequence of clusters in the trace to a repository for future mappings.

19. A computing system, comprising:
memory storing computer program instructions; and
at least one processor configured to execute the computer program instructions, wherein the computer program instructions are configured to cause the at least one processor to:
run a clustering artificial intelligence (AI)/machine learning (ML) model on vector representations of a sequence of screens pertaining to a captured task flow to produce a trace comprising a sequence of clusters; and
run a classifier AI/ML model on the sequence of clusters in the trace from the clustering AI/ML model; and
when the classifier AI/ML model identifies a task type from the sequence of clusters in the trace:
map the classified task type to a robotic process automation (RPA) workflow that accomplishes an intent of the captured task flow, wherein
the classifier AI/ML model is configured to compare the sequence of clusters in the trace from the clustering AI/ML model to other sequences of clusters representing traces from previously identified task types to determine the task type, or
the classifier AI/ML model is configured to represent individual screens or the sequence of screens as vectors and compute a vector distance from vectors for previously identified task types.

20. The computing system of claim 19, wherein the clustering AI/ML model receives and uses system information, semantic information from a natural language processing (NLP) model, or both, to provide context to the classified task type.

21. The computing system of claim 20, wherein the system information comprises user interaction events, application programming interface (API) events, operating system (OS)/document object model (DOM) events, user interaction/input types, location data, an indication of which mouse button was pressed, an application or process name, a UI descriptor, or any combination thereof.

22. The computing system of claim 19, wherein the computer program instructions are further configured to cause the at least one processor to:
automatically generate or open the RPA workflow that accomplishes the intent of the captured task flow in an RPA designer application.

23. The computing system of claim 19, wherein when the classifier AI/ML model does not identify a task type from the sequence of clusters in the trace, the computer program instructions are further configured to cause the at least one processor to:
   automatically generate activities for actions in the task flow.

24. The computing system of claim 23, wherein the automatic generation of the activities comprises creating user interface (UI) descriptors for the generated activities using the sequence of screens, system information, semantic information from a natural language processing (NLP) model, or any combination thereof.

25. The computing system of claim 23, wherein the computer program instructions are further configured to cause the at least one processor to:
   generate an RPA workflow comprising the generated activities.

26. The computing system of claim 25, wherein the computer program instructions are further configured to cause the at least one processor to:
   send the trace of the sequence of clusters in the trace to a repository for future mappings.

* * * * *